US010604242B2

(12) United States Patent
Chan

(10) Patent No.: US 10,604,242 B2
(45) Date of Patent: Mar. 31, 2020

(54) MULTI-ROTOR ROTO-CRAFT FLYING MACHINE

(71) Applicant: HYPERDRONAMICS PTY. LTD., Vermont, Victoria (AU)

(72) Inventor: Joy Yin Chan, Vermont (AU)

(73) Assignee: HYPERDRONAMICS PTY. LTD., Vermont, Victoria (AU)

( * ) Notice: Subject to any disclaimer, the term of this patent is extended or adjusted under 35 U.S.C. 154(b) by 254 days.

(21) Appl. No.: 15/757,282

(22) PCT Filed: Sep. 1, 2016

(86) PCT No.: PCT/AU2016/050823
§ 371 (c)(1),
(2) Date: Mar. 2, 2018

(87) PCT Pub. No.: WO2017/035593
PCT Pub. Date: Mar. 9, 2017

(65) Prior Publication Data
US 2018/0244377 A1    Aug. 30, 2018

(30) Foreign Application Priority Data

Sep. 3, 2015   (AU) .................................. 2015903605

(51) Int. Cl.
*B64C 27/08* (2006.01)
*B64C 27/605* (2006.01)
(Continued)

(52) U.S. Cl.
CPC .............. *B64C 27/08* (2013.01); *B64C 27/12* (2013.01); *B64C 27/14* (2013.01); *B64C 27/605* (2013.01);
(Continued)

(58) Field of Classification Search
CPC .............. B64C 27/08; B64C 2201/108; B64C 2201/024; B64C 27/12; B64C 27/14;
(Continued)

(56) References Cited

U.S. PATENT DOCUMENTS 2,529,629 A    11/1950  Pullen et al.
2,651,480 A *  9/1953  Pullin ..................... B64C 27/08
                                                     244/17.23
(Continued)

FOREIGN PATENT DOCUMENTS

CN      103359284 A     10/2013
GB          644504 A *  10/1950 ............. B64C 27/82
(Continued)

OTHER PUBLICATIONS

International Search Report and Written Opinion dated Dec. 9, 2016 from International Application No. PCT/AU2016/050823, 18 pages.
(Continued)

*Primary Examiner* — Christopher P Ellis
(74) *Attorney, Agent, or Firm* — MH2 Technology Law Group, LLP

(57) ABSTRACT

A multi-rotor flying machine includes a body on or in which a motor is mounted; and a respective head rotor mounted for rotation on a respective mast at each of at least three locations disposed around and spaced laterally outwardly from the motor. The motor is drivingly connected to each mast, for rotating each head rotor, by a respective driveline. Adjacent to at least one mast, the machine further includes a pitch rudder system that includes a pitch driver or rotor, or translational rotor. The arrangement is such that the head rotors are operable to provide thrust, while the pitch rudder system enables yaw to be achieved independently of operation of the head rotors.

17 Claims, 14 Drawing Sheets

(51) Int. Cl.
  *B64C 39/02* (2006.01)
  *B64D 35/04* (2006.01)
  *B64C 27/80* (2006.01)
  *B64C 27/82* (2006.01)
  *B64C 27/68* (2006.01)
  *B64C 27/14* (2006.01)
  *B64C 27/12* (2006.01)
  *B64D 35/06* (2006.01)

(52) U.S. Cl.
  CPC .............. *B64C 27/68* (2013.01); *B64C 27/80* (2013.01); *B64C 27/82* (2013.01); *B64C 39/024* (2013.01); *B64D 35/04* (2013.01); *B64C 2201/024* (2013.01); *B64C 2201/044* (2013.01); *B64C 2201/108* (2013.01); *B64D 35/06* (2013.01)

(58) Field of Classification Search
  CPC ....... B64C 27/605; B64C 27/80; B64C 27/82; B64C 39/024; B64C 2027/8209; B64C 2027/8227; B64D 35/04; B64D 35/06
  USPC ....................................... 244/17.23
  See application file for complete search history.

(56) References Cited

U.S. PATENT DOCUMENTS

| | | | |
|---|---|---|---|
| 3,053,480 | A | 9/1962 | Vanderlip |
| 3,181,816 | A | 5/1965 | Pfleiderer |
| 6,467,726 | B1 | 10/2002 | Hosoda |
| 7,585,153 | B1 | 9/2009 | Schmaling et al. |
| 9,586,683 | B1* | 3/2017 | Buchmueller ........ B64C 39/024 |
| 9,764,829 | B1* | 9/2017 | Beckman ................ B64C 15/14 |
| 10,053,213 | B1* | 8/2018 | Tu ......................... B64C 39/024 |
| 10,494,088 | B1* | 12/2019 | Coralic ................. B64C 39/024 |
| 2004/0217229 | A1* | 11/2004 | Arlton ..................... A63H 27/12 244/17.11 |
| 2015/0274286 | A1* | 10/2015 | Kereth .................... B64C 27/10 244/17.21 |
| 2016/0010627 | A1* | 1/2016 | Austin ...................... F03D 3/02 290/55 |
| 2017/0043870 | A1* | 2/2017 | Wu ....................... B64C 39/024 |
| 2017/0210470 | A1* | 7/2017 | Pardell .................... B08B 3/024 |
| 2017/0283042 | A1* | 10/2017 | Gamble ................. B64C 27/10 |
| 2018/0057163 | A1* | 3/2018 | Sababha ............... B64C 39/024 |
| 2019/0009895 | A1* | 1/2019 | Tu ........................... B64C 27/82 |
| 2019/0061934 | A1* | 2/2019 | Kawiecki ............. B64C 29/0033 |
| 2019/0135424 | A1* | 5/2019 | Baity ...................... B64C 11/46 |
| 2019/0185149 | A1* | 6/2019 | Pantalone .............. B64C 27/001 |
| 2019/0256218 | A1* | 8/2019 | Correa Hamill ...... B64C 39/024 |
| 2019/0258139 | A1* | 8/2019 | Overall ................... B64C 27/08 |
| 2019/0263513 | A1* | 8/2019 | Randall .................. B64C 27/22 |
| 2019/0276140 | A1* | 9/2019 | Poltorak ................ B64C 39/024 |
| 2019/0329882 | A1* | 10/2019 | Baity ...................... B64C 27/08 |

FOREIGN PATENT DOCUMENTS

| | | | | |
|---|---|---|---|---|
| GB | 646867 | A * | 11/1950 | ............ B64C 27/82 |
| JP | 2002347698 | A | 12/2002 | |
| KR | 20150052578 | A | 5/2015 | |
| WO | 2006/112578 | A1 | 10/2006 | |
| WO | 2012/162421 | A1 | 11/2012 | |
| WO | 2016/164280 | A1 | 10/2016 | |
| WO | WO-2016164280 | A1 * | 10/2016 | ............ B64C 27/82 |
| WO | WO-2019097425 | A1 * | 5/2019 | ............ B64C 11/44 |

OTHER PUBLICATIONS

International Preliminary Report on Patentability dated Aug. 2, 2017 from International Application No. PCT/AU2016/050823, 24 pages.
Extended European Search Report and Opinion dated Mar. 13, 2019 from European Patent Application No. 2016840422.6, Authorized Officer, Herve Douhet (7 pages).

* cited by examiner

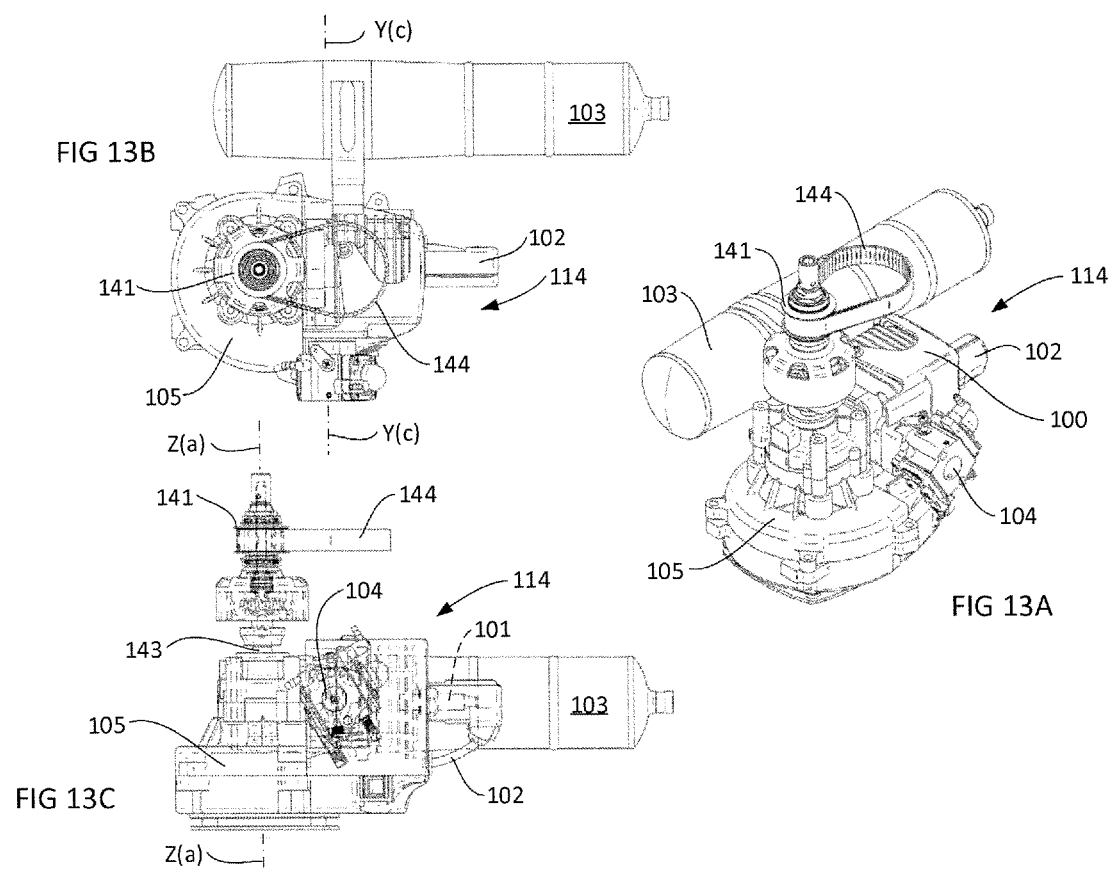

MULTI-ROTOR ROTO-CRAFT FLYING MACHINE

CROSS-REFERENCE TO RELATED APPLICATIONS

This application is a U.S. National Stage application of PCT/AU2016/050823 filed 1 Sep. 2016, which claims priority to Australian Application No. 2015903605 filed 3 Sep. 2015, the entire disclosures of which are hereby incorporated by reference in their entireties.

FIELD OF THE INVENTION

This invention relates to an improved multi-rotor type of roto-craft flying machine, having a number of head rotors each mounted for rotation around a respective mast.

The invention has particular application to multi-rotor machines of the multi-copter type, including such machines suitable for use as an unmanned aerial vehicle (UAV) or as a drone. Herein the invention largely is described with reference to such machines. However, the invention is to be understood as extending to manned aerial vehicles comprising helicopters having a number of head rotors each mounted for rotation around a respective mast.

BACKGROUND TO THE INVENTION

With multi-rotor UAV and drone technologies, there are specific limitations on flight time, payload and aerodynamic control. Existing designs for machines based on these technologies make extensive use of multiple arms or outriggers on each of which a respective electric motor is mounted for rotating the respective head rotor. Configurations used include three, four, six or eight arms or outriggers as popular choices, although there are other arrangements that are possible. It is common for these configurations to utilise head rotors that generate thrust by fixed pitch rotary wings or rotor blades. As in all aeronautical applications, thrust is somewhat proportional to rotary wing or blade speed, ignoring efficiencies and specific aerodynamic specialties.

With machines operating with head rotors having such fixed pitch wings or blades, lift, yaw, pitch and roll are achieved by variation in the relative speed of selected electric motors. Thus, for a machine having a quadcopter arrangement of four motors, the speed of one opposed pair of motors can be varied relative to the other opposed pair of motors of the machine. However, particularly with yaw (also referred to as "pirouette"), functionality is compromised by such use of the electric motors. Yaw, or yaw rate, generally is achieved by speeding up or slowing down selected motors to generate a net torque about a central axis perpendicular to a plane in which the machine is travelling. Quite often responsiveness is slow or weak, as the extent to which selected motors are slowed down cannot be so great as to risk compromising the necessary overall lift imparted to the machine. The limited responsiveness is most evident when a multi-rotor machine is ascending or descending while also pirouetting. These simultaneous actions generally lead to clumsy movement or to compromises in flight characteristics.

Such limitations with current machines may be reduced, or even be overcome, as advances are made in electronic control or governance. However, even if this proves to be the case, the machines are likely to continue to be limited in terms of flight times. It is not uncommon for the electric motors of multi-rotor machines to be able to perform duties for not more than about 10 to 20 minutes, even with the optimum current lithium polymer batteries, while the flight performance over the operating time deteriorates as the battery charge level reduces with flight time. The current limited flight times able to be obtained with multi-rotor machines operating with individual electric motors are expected to continue into the future, restricting the range of applications in which the machines can be used effectively. There may be improvement in flight times as a result of advances in battery technology. However, it is unlikely that these times will double or quadruple, let alone increase by an order of magnitude as required to achieve significantly enhanced flight times.

The present invention is directed to providing an improved multi-rotor flying machine that, at least in the context of multi-rotor machines of the multi-copter type, including such machines suitable for use as a UAV or as a drone, enables the limitations discussed above to be reduced or overcome. However, the present invention also is applicable to manned aerial vehicles comprising helicopters having a number of head rotors each mounted for rotation around a respective mast.

BROAD SUMMARY OF THE INVENTION

The present invention provides a multi-rotor flying machine, wherein the machine includes a body on or in which a motor is mounted; and a respective head rotor mounted for rotation on a respective mast at each of at least three locations disposed around and spaced laterally outwardly from the motor. The motor is drivingly connected to each mast, for rotating each head rotor, by a respective driveline. Adjacent to at least one mast, the machine further includes a pitch rudder system that includes a pitch driver or rotor, or translational rotor. The arrangement is such that the head rotors are operable to provide thrust, while the pitch rudder system enables yaw to be achieved independently of operation of the head rotors.

The machine may have only a single pitch rudder system. However, the machine may have a respective pitch rudder system adjacent to each of at least two of the masts. In one form the machine has a respective pitch rudder system adjacent to each mast.

In a first form, the present invention provides a multi-rotor flying machine having at least three main arms or outriggers, each extending outwardly in a respective direction from the body, with each main arm or outrigger having a respective one of the head rotors mounted for rotation on the respective mast at, or adjacent to, an end of the main arm or outrigger remote from the body. The motor is drivingly connected to each mast by the respective driveline extending along a respective main arm or outrigger. At least one main arm or outrigger has a pitch rudder system that includes a pitch driver or rotor, or translational rotor, mounted at its end remote from the body.

In a second form, the body extends outwardly beyond the motor and has a chassis on which the motor and each of the masts are supported, and across which each of the drivelines extend. Particularly in that form, the body may have an interior able to provide accommodation for operating personnel. The interior also may provide interior space for freight, passengers or a combination of freight and passengers. However the body of the first form also may have such an interior, despite each mast being mounted at the remote end of an arm or outrigger extending outwardly from the body. Again, the machine has at least one pitch rudder system.

In each form of the machine, the arrangement is such that the masts are disposed substantially symmetrically with respect to a centre line from a front to a rear end of the machine. The number and arrangement of the masts may be such that the masts are disposed around the body in a uniform polygonal array, such as a triangular, quadrilateral, pentagonal, hexagonal or octagonal array. In the first form of the machine, the body may have a shape that conforms to such polygonal array although, alternatively, the body may be of other convenient shapes. In the second form of the machine, the body most conveniently has a shape at least similar to the polygonal array.

Where the machine has only one pitch rudder system, the one system most conveniently is disposed adjacent to a mast so as to be on or adjacent to the front to rear centreline, more conveniently at the rear end. However, for a machine having at least two pitch rudder systems, each of the systems is adjacent to a respective mast, while the systems preferably are disposed symmetrically with respect to the centreline. Thus, for a machine with two pitch rudder systems, they either each are disposed on or adjacent to the centreline or spaced to a respective side of the centreline. A machine with three pitch rudder systems will have one on or adjacent to the centreline with each of the other two spaced to a respective side of the centreline. As previously indicated, each pitch rudder system is adjacent to a respective mast.

The machine may have a single respective head rotor mounted for rotation on each mast. Each single head rotor most conveniently is mounted at or adjacent to the head of the respective mast. Each single head rotor may be rotatable on or with the respective mast. In an alternative arrangement, a respective co-axial pair of head rotors is mounted for rotation on each mast. The rotors of each pair most conveniently are mounted for contra-rotation. Each rotor of each pair may be mounted for rotation on or with respect to the respective mast, such as at or adjacent to the head of the mast. Each pair of rotors may comprise a lower rotor that is mounted for rotation on an outer sleeve that forms part of the mast, and an upper rotor mounted for rotation on a shaft of the mast that is disposed within a bore defined by the outer sleeve.

A number of practical advantages are obtainable with the machine according to the invention. A first advantage is that it enables use a single motor, while the single motor can have a larger work capacity than the aggregate capacity of the individual electric motors. A second advantage is that the single motor is able to have a significantly increased power to weight ratio than the aggregate for the individual electric motors. Instead of a plurality of individual electric motors, a single electric motor can be used in a machine according to the invention, at least in the case of a UAV. However, the invention provides the further important advantage that the machine can, and preferably does, have a single motor comprising an internal combustion (IC) engine instead of individual electric motors.

With use of an IC engine in a machine according to the invention, the IC engine may be one operable on petrol, gas, ethanol or any other suitable fluid fuel, whether gaseous or liquid fuel. The IC engine may be an intermittent combustion engine such as a 2-stroke or a 4-stroke petrol or diesel powered engine, or a continuous combustion engine such as a gas turbine engine. Particularly in the context of a UAV or a drone, a single IC engine is able to provide sufficient power and endurance for greatly extended flight times. For example, a machine according to the invention, suitable for use as a UAV or drone and having a 25 cc 2-stroke IC engine operated on petrol, has been found to be operable continuously for flight times of 40 to 60 minutes per litre of petrol. The actual time varied with air speed, although the maximum fuel consumption during these extended flights was less than 25 ml per minute. Current indications are that considerably longer flight times can be achieved. Also, unlike electric motor, an IC engine is able to maintain any level of output power within its range while fuel is available, whereas electric motors need to operate at a high speed for maximum efficiency but available speed declines with battery voltage.

An example of a suitable 2-stroke IC engine for use in a machine according to the present invention is an engine in accordance with the disclosure of international patent specification WO2014/078894, the disclosure of which is incorporated herein. The engine of WO2014/078894 is an IC having an engine mechanism including a crankshaft having a crankpin to which each piston of an opposed pair of pistons is connected and by which the pistons reciprocate in a respective one of axially inline cylinders. A crosshead of the engine has opposite ends on each of which a respective one of the pistons is mounted. Also, the engine has a coupling between the crosshead and the crankpin by which the pistons are caused to oscillate circumferentially as the pistons are driven to reciprocate, with the circumferential oscillation enabling adoption of asymmetric port timing, with each piston preferably having a crown defining formations able to co-operate with inlet and exhaust ports to enable the asymmetric port timing.

The single motor of a machine according to the invention may be operable to provide substantially the same drive to each head rotor such that the head rotors all rotate at substantially the same speed. This is highly desirable, particularly as it enables yaw and yaw rate to be controlled independently of the speed at which the head rotors are rotated. By provision of suitable gearing, some variation of the speed of rotation of at least one head rotor relative to another head rotor can be enabled; with such variation preferably enabled between the head rotors of one opposed pair relative to those of another opposed pair. However, variation in head rotor speed is not necessary, as the main benefit of such variation is to enable a change in pitch or roll and, in a machine according to the invention, this benefit preferably is enabled by other means.

While each head rotor is rotatable by drive from a respective driveline acting between the motor and the mast on which the head rotor is mounted, each head rotor preferably is mounted on its respective mast in a manner enabling control of the pitch of the rotary wings or blades of the head rotor. For this, each wing or blade is rotatable on an axis extending along the wing or blade, substantially radially with respect to the mast on which the head rotor is rotatable. Thus, the wings or blades of each head rotor can be adjusted in unison to a required positive, negative or neutral inclination with respect to a plane or rotor disc in which the head rotor is rotatable. Each head rotor may comprise two substantially in-line rotary wings or blades disposed on a common axis extending normal to and through the mast. Alternatively, each head rotor may have at least three uniformly spaced wings or blades each disposed on a respective axis that extends radially with respect to the mast. In each case, for control of the pitch, each wing or blade is adjustable by rotating around the respective axis. The means for control of each wing or blade of a head rotor may comprise a respective adjustment assembly mounted adjacent to the mast for each head rotor, such as on the respective main arm or outrigger where these are provided, with the assembly able to be activated from a control device.

Each adjustment assembly may include a respective linkage system operable to rotate each wing or blade of a head rotor for varying the pitch of the wings or blades between positive and negative extremes. Each assembly most conveniently is mounted, such as at or near to the mast of the head rotor, so as to be able to facilitate provision of a compact linkage system. The linkage system of each adjustment assembly may be operable to vary the pitch of each wing or blade through the action of a respective servomotor device. The servomotor device may have a rotatable output member able to be reversibly movable between extreme positions, with the output member connected through the linkage system for adjusting the pitch of the wings or blades of the respective head rotor.

The mast may comprise an outer sleeve and a shaft extending co-axially within the sleeve, with the head rotor mounted for rotation on or with the shaft relative to the sleeve. With a mast of this form, the adjustment assembly may be operable to vary the pitch of the wings or blades of the head rotor by adjusting the shaft axially relative to the sleeve. In one arrangement, the axial adjustment of the shaft relative to the sleeve may be achieved by provision of a servomotor device. An output member of the servomotor is connected to the shaft by a first part of a linkage system, while a second part of the linkage system provides a connection between the sleeve and each wing or blade of the head rotor. The arrangement is such that actuation of the servomotor device adjusts the first part of the linkage system to cause the shaft to be raised or lowered relative to the sleeve, with this relative movement of the shaft resulting in adjustment of the second part of the linkage system to cause the wings or blades to rotate in a required direction on its respective axis through an angle sufficient to vary their pitch by a required amount.

In an alternative arrangement, the output member of the servomotor device is connected through a first part of the linkage system to a fixed one of two adjacent annular discs mounted co-axially with respect to the mast, with the other one of the two discs rotatable and connected to each wing or blade of the rotor by a second part of the linkage system. The arrangement is such that actuation of the servomotor device adjusts the first part of the linkage system to cause the adjacent discs to move axially with respect to the mast, with this axial movement resulting in adjustment of the second part of the linkage system to cause the wings or blades to rotate and thereby vary their pitch.

In the arrangements for varying the pitch of the wings or blades, the servomotor device may be connected to one end of an elongate member, with the other end of the elongate member connected to the first part of the linkage system. Arcuate movement of the output member results in longitudinal push-pull movement of the elongate member end for causing variation of the pitch of the wings or blades through adjustment of the first and second parts of the linkage system. However such push-pull arrangement using an elongate member can be avoided by a more direct connection between an output member of the servomotor device and the first part of the linkage system. Thus, the output member may comprise a rotatable output rod that carries a rotatable disc or a radial arm, with at least one link member of the first part of linkage system connected to the rotatable disc or radial arm.

In each adjustment assembly arrangement including two adjacent discs in the linkage system, the discs may form a swashplate with the discs able to tilt in unison relative to the respective mast. The upper disc is rotatable with the mast, while the lower plate is held against rotation. Each wing or blade is connected by a respective upper links of the link system to the upper plate and the lower plate is connected by a respective lower links of the link system to the output member of the servomotor device. Actuation of the servomotor device to move the output member between the extreme positions adjusts the lower links to cause tilting of the lower disc in a direction dependant on the position to which the output member is moved between the extremes, causing corresponding tilting of the upper plate that adjusts the upper links and thereby adjusting the pitch by causing a change in the inclination of the rotary wings or blades to a plane in which the head rotor is rotatable. The change in inclination relative to that plane may be to a positive, negative or neutral position.

In the preceding description, the servomotor where used may be powered by a battery pack used to power an electric motor by which drive is provided to the head rotors. However, where drive for the head rotors is provided by an internal combustion engine, the servomotor may be powered by a minor battery pack maintained by an alternator driven by the IC motor, and voltage regulator.

Each main arm or outrigger is of an elongate form and most conveniently houses the driveline for the respective head rotor. The main arm or outrigger may be of a channel shape in cross-section, but preferably is of tubular form, such as of round or square section tubular form. In each form, each main arm or outrigger is sufficiently stiff and strong as to be able to retain its form despite robust use. The main arms or outriggers may be made of a suitable synthetic plastics material, such as an engineering plastics material, such as fibre-reinforced plastics material, for example a carbon fibre reinforced plastics material. Alternatively, the main arms or outriggers may be made of a suitable light metal alloy, such as an aluminium alloy or a titanium alloy. Most preferably the body and the arms or outriggers form part of a monocoque chassis construction.

The body preferably is made of a similar material to that indicated for the main arms or outriggers. The body may be formed integrally with the main arms or outriggers. However, to facilitate replacement of a damaged part, the main arms or outriggers may be, and preferably are, secured to the body by a releasable connection. The releasable connections by which the main arms or outriggers are secured to the body may be of any convenient form, such as by provision of screw-threaded connectors.

While the motor may be mounted in or on the body, the motor preferably is housed within the body. The motor may be mounted in any convenient manner enabling driving connection of an output member of the motor to each mast, through a respective driveline, for simultaneous rotation of each head rotor. The motor may have an output shaft rotatable on an upright axis, with the output shaft having an output member drivingly connected to a respective rotatable member of the driveline for each main arm or outrigger. The output member may be a gear, while each rotatable member may be a gear of a first gear system of the driveline. In that case, the driveline may further include a drive shaft that is rotatable by the first gear system and that extends, preferably through a respective main arm or outrigger, to a second gear system of the driveline at the remote end of the main arm or outrigger, with the second gear system drivingly connected to a gear member on the mast of a respective head rotor. The arrangement is such that the motor is able to provide drive for simultaneous rotation of each head rotor through the respective driveline. While each head rotor preferably is rotated at the same speed, it is possible for at least one head rotor to be rotated at a different speed to the others, due to a difference in the gear ratio for the driving connection at one or other or both of the ends of the drive shaft.

Alternatively, the output member on the drive shaft of the motor may be a gear that imparts drive to a respective first pulley wheel or gear of each driveline, with the driveline also including an endless cable or belt that passes around the first pulley wheel or gear, along the main arm or outrigger to the remote end, and around a second pulley wheel or gear of the driveline that imparts drive to a gear member on the mast. In this case, the motor again is able to provide drive for simultaneous rotation of each head rotor through the respective driveline. Again, all of the head rotors may be rotatable at the same speed, or at least one bay be rotatable at a different speed to the others, depending on the drive ratio at one, the other or each end of the endless cable or belt, as determined by the output member and the first pulley wheel and/or the second pulley wheel and the gear member on the mast.

As indicated, a pitch rudder system is mounted adjacent to at least one mast, such as adjacent to the end of a main arm or outrigger that is remote from the body. There may be a respective pitch rudder system adjacent to at least two or more masts. In one form, there is a respective pitch rudder system adjacent to each mast, such as adjacent to the remote end of each main arm or outrigger. The pitch rudder system, or each of the at least two pitch rudder systems, may be mounted on the respective main arm or outrigger, at the remote end. Drive for the pitch rudder system may be provided from the lower end of the respective mast, although it generally is preferred that this is not the case. There is a need for clearance between the respective head rotor and a pitch driver or rotor of the pitch rudder system, given that the pitch driver or rotor will be rotatable on a horizontally disposed axis, in a plane substantially perpendicular to a plane in the head rotor is rotatable, and it therefore is preferred for the or each pitch rudder system to be mounted below and not on the respective main arm or outrigger. To enable this, machine may be provided with a secondary arm or outrigger below each main arm or outrigger having a pitch rudder system at its remote end, with the pitch rudder system mounted on the secondary arm or rudder system.

In order that the invention may be understood more fully, reference now is made to the accompanying drawings, in which.

Figure 1:
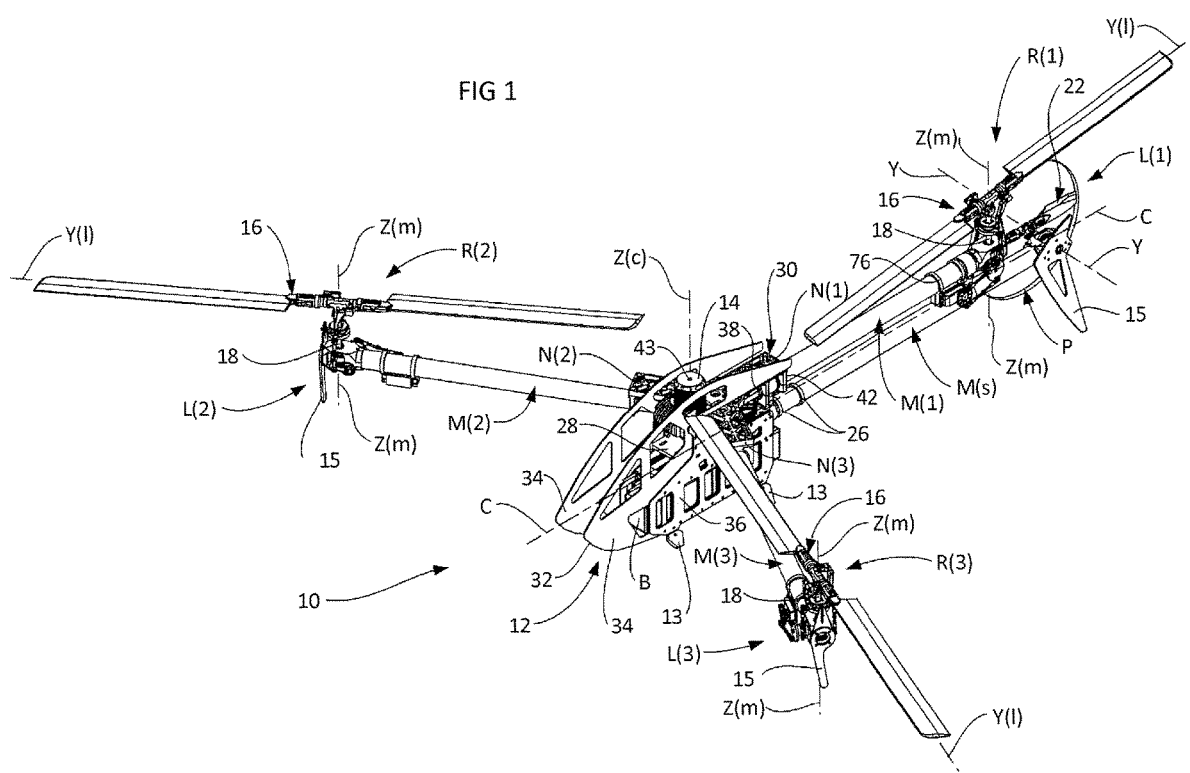
FIG. 1 shows a multi-rotor flying machine according to one embodiment of the invention, in a perspective view from forward of and above the machine.
Figure 2:
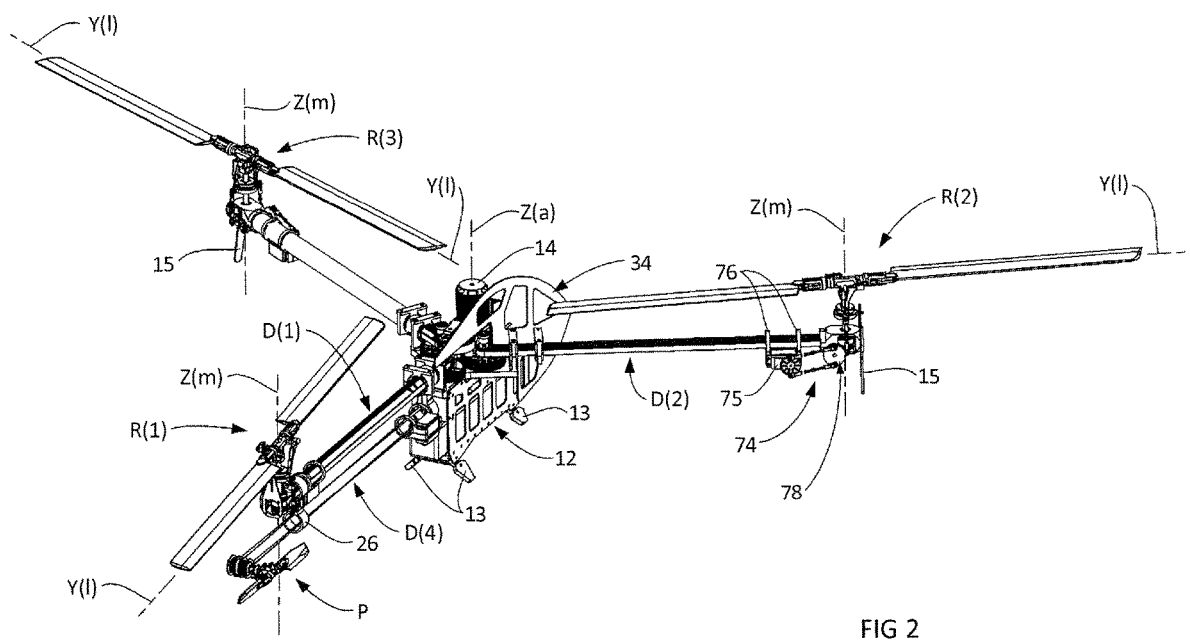
FIG. 2 shows the machine of FIG. 1, in a perspective view from rearward of and above the machine and with some components omitted.
Figure 3:
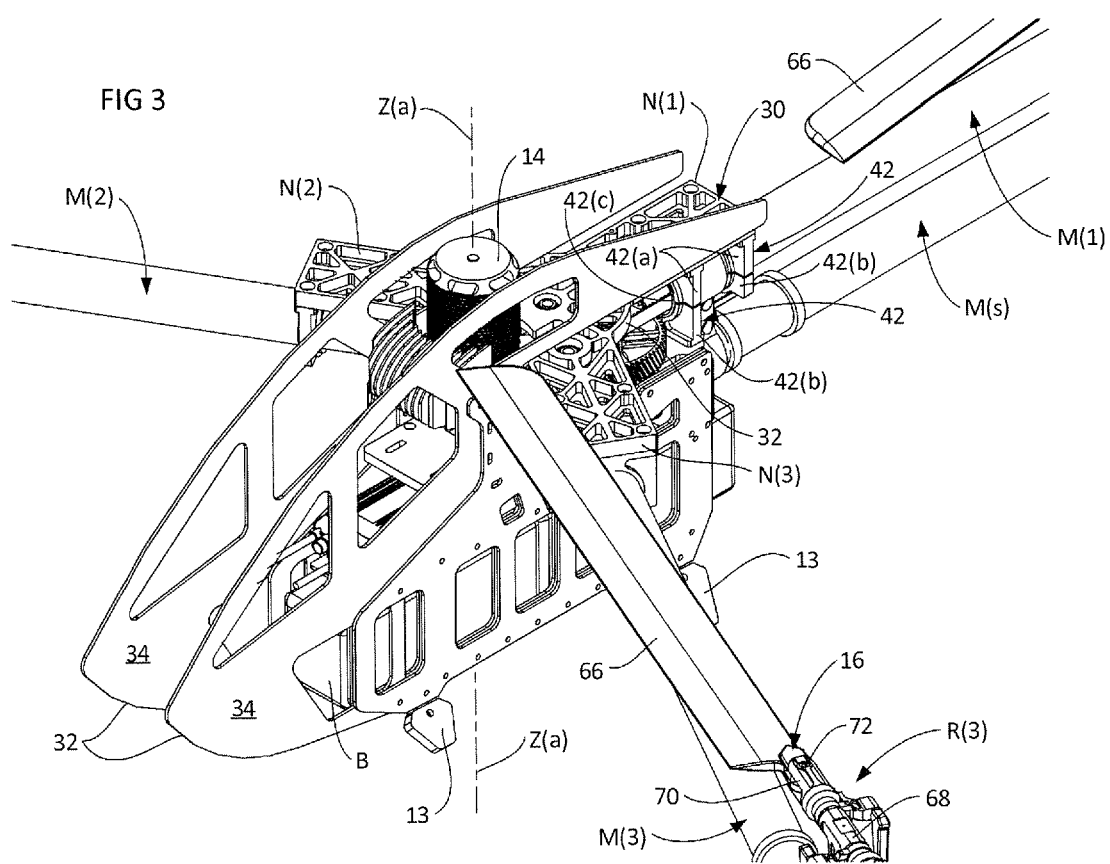
FIG. 3 shows a central region of the machine of FIG. 1, on an enlarged scale.
Figure 4:
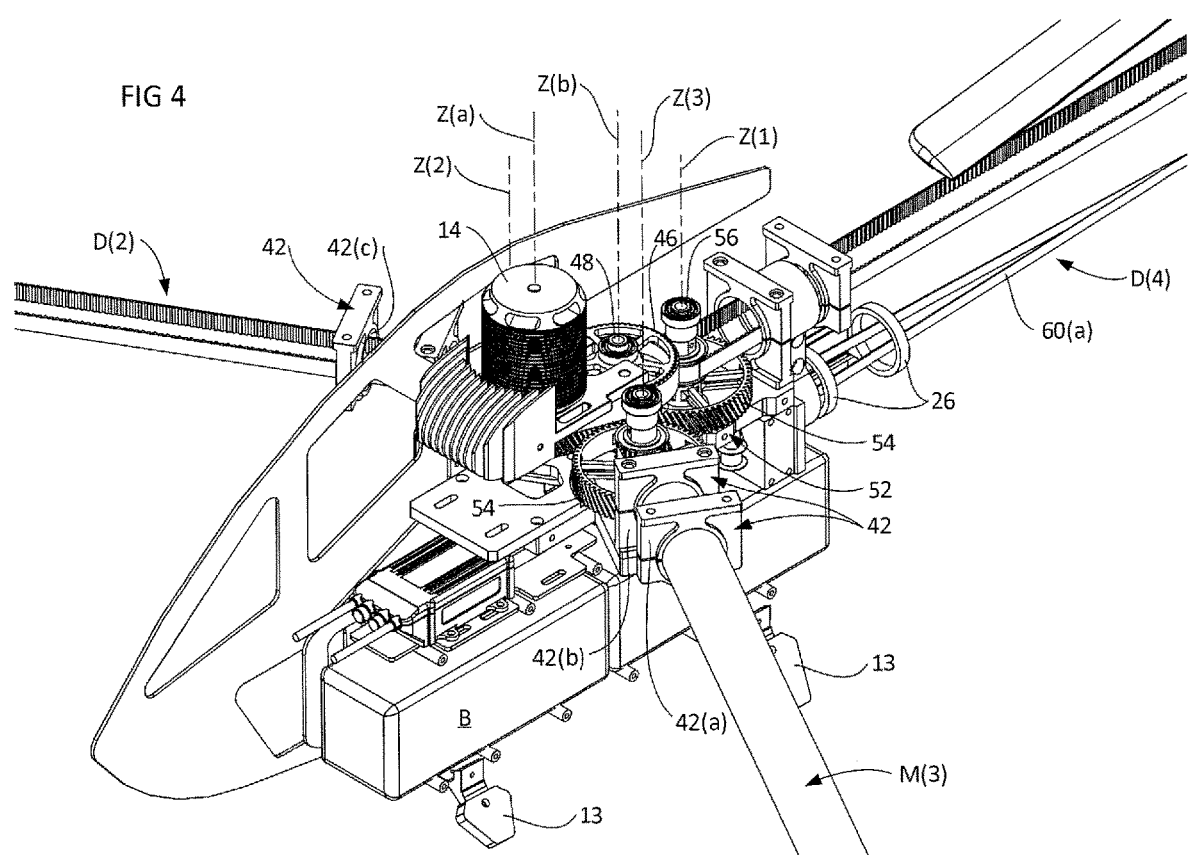
Figure 5:
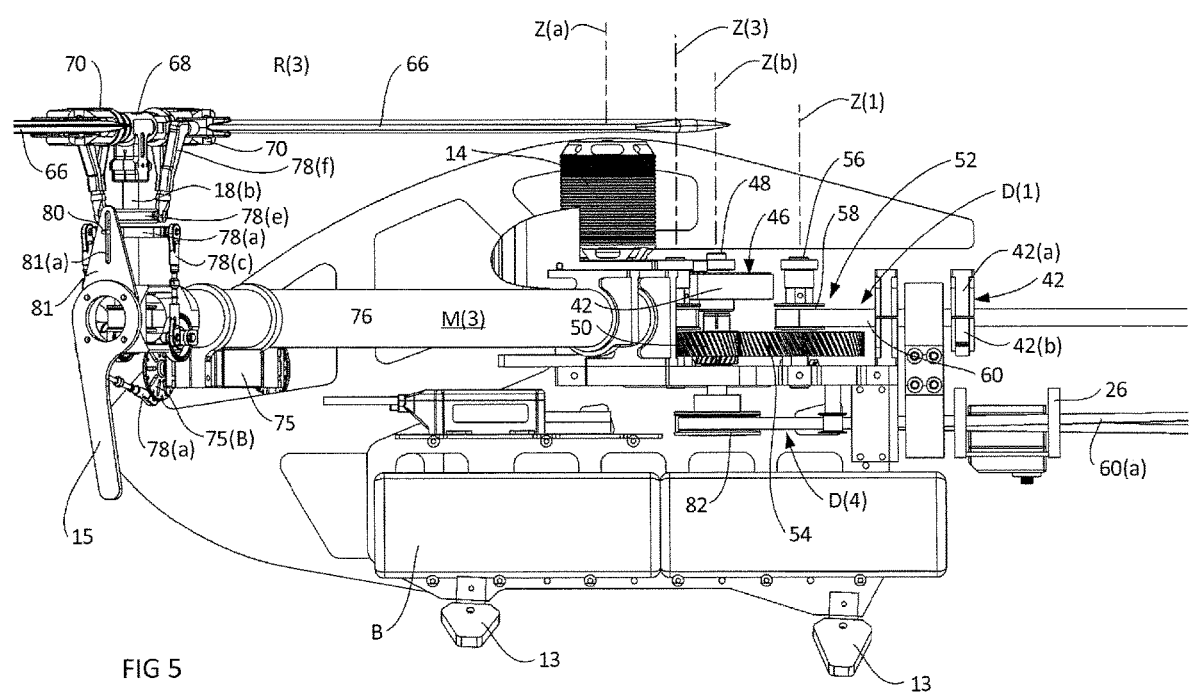
Figure 6:
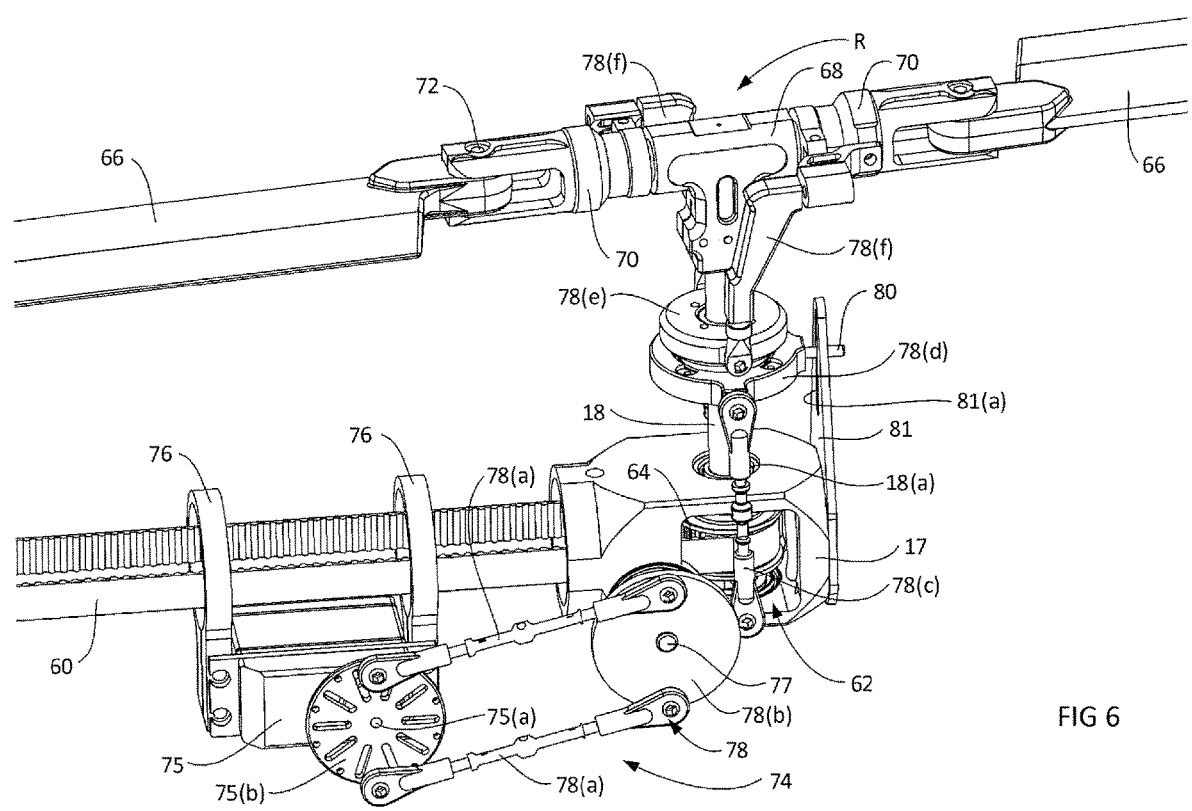
Figure 7:
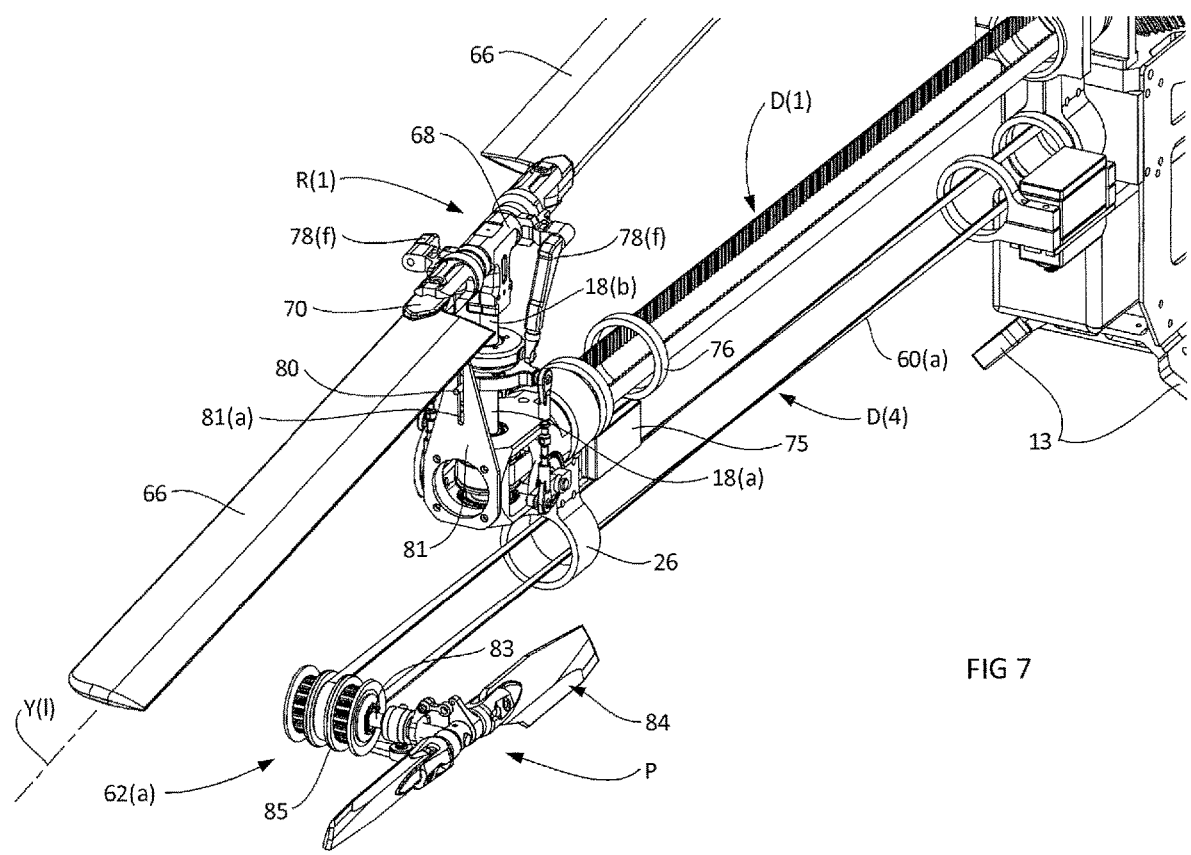
Figure 8:
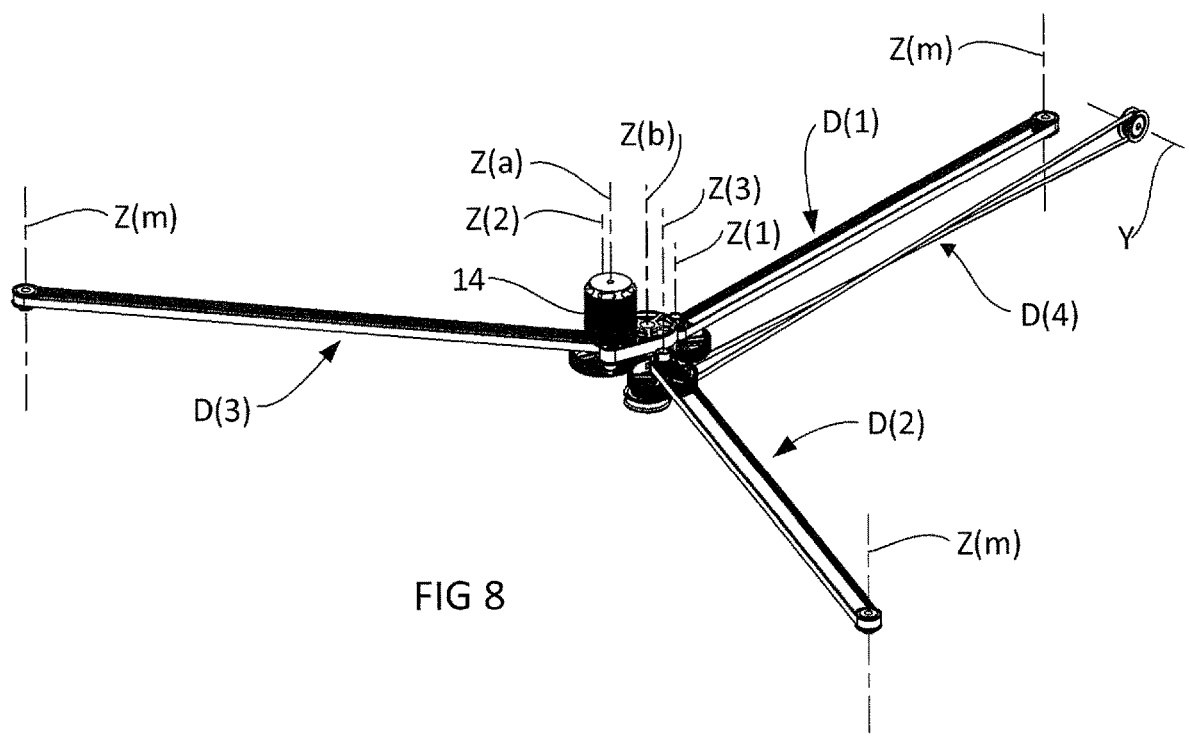
Figure 15:
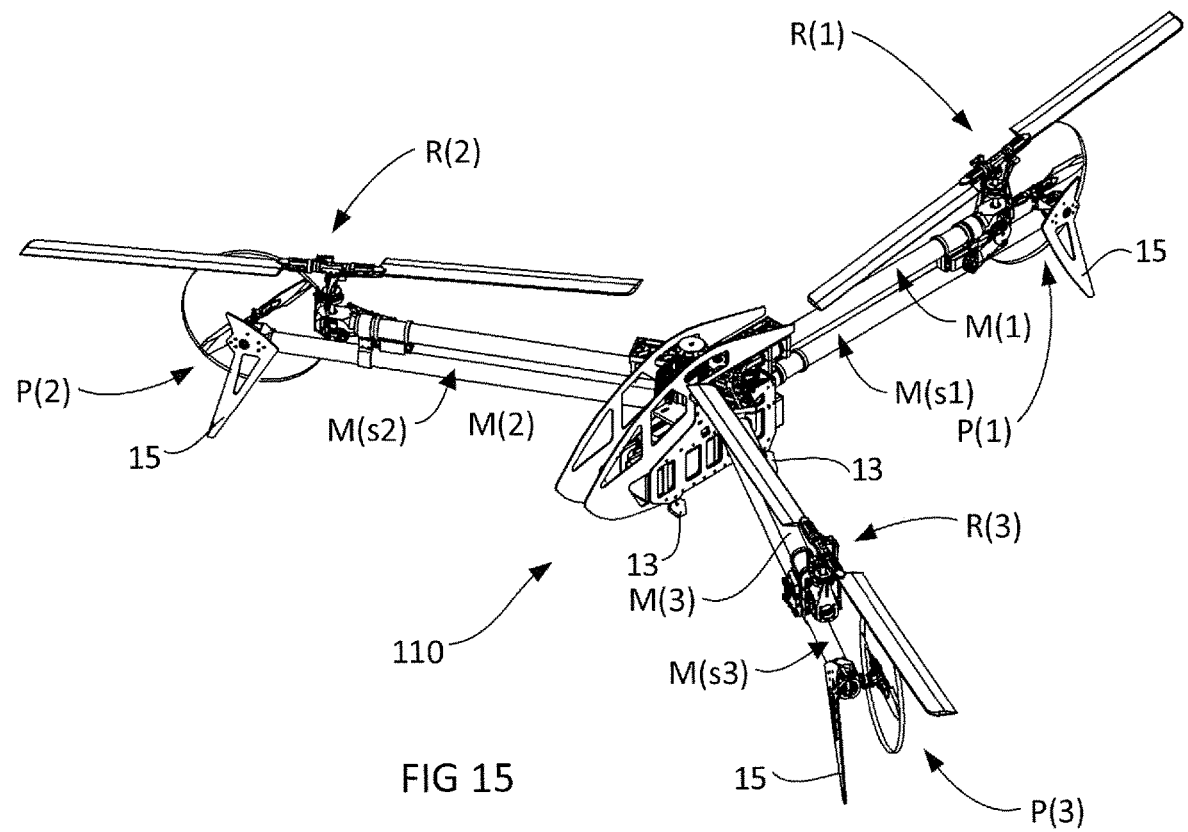
Figure 9:
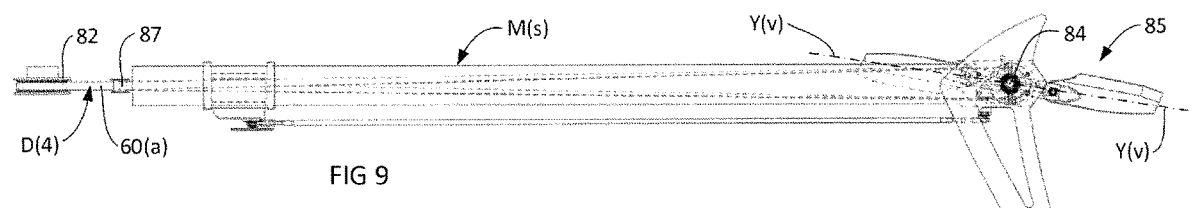
Figure 10:
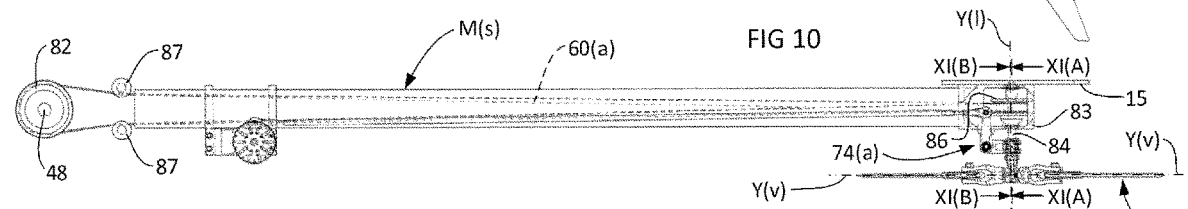
Figure 11B:
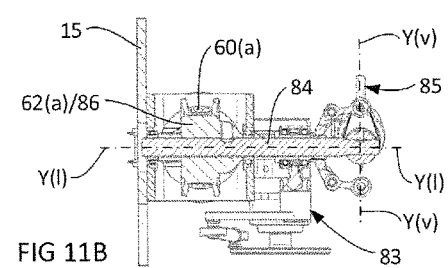
Figure 11A:
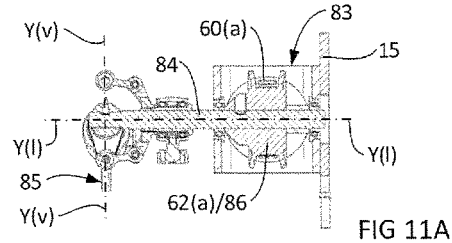
Figure 12A:
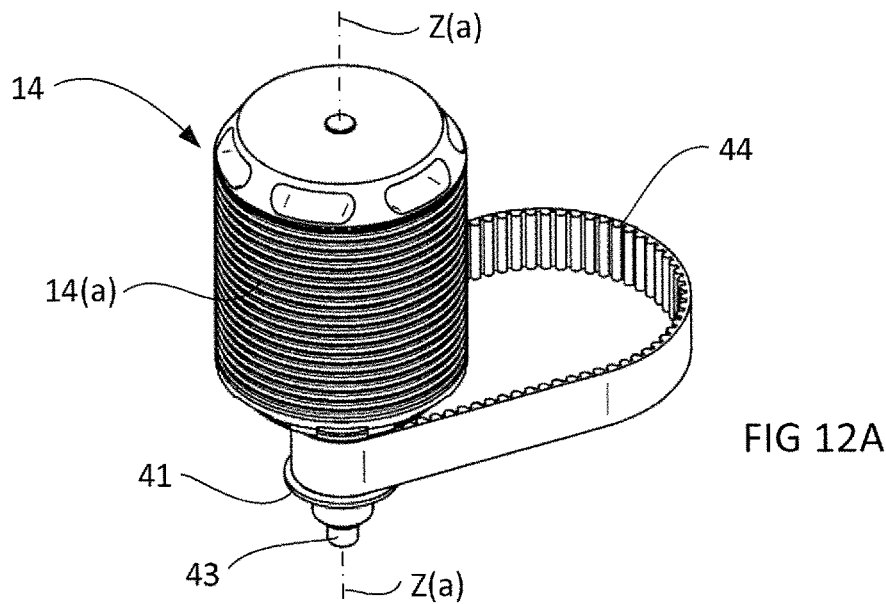
Figure 12B:
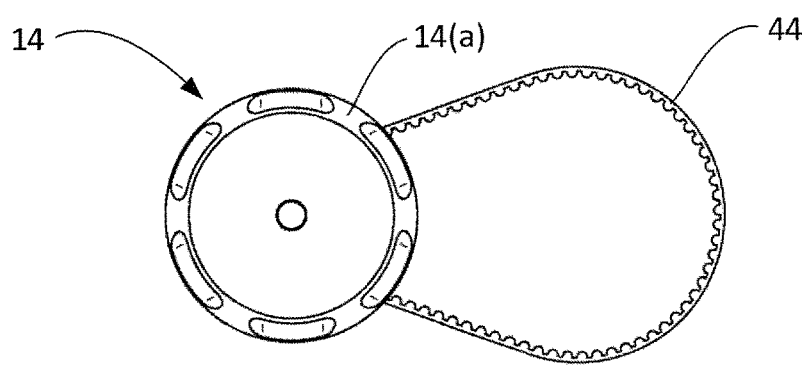
Figure 12C:
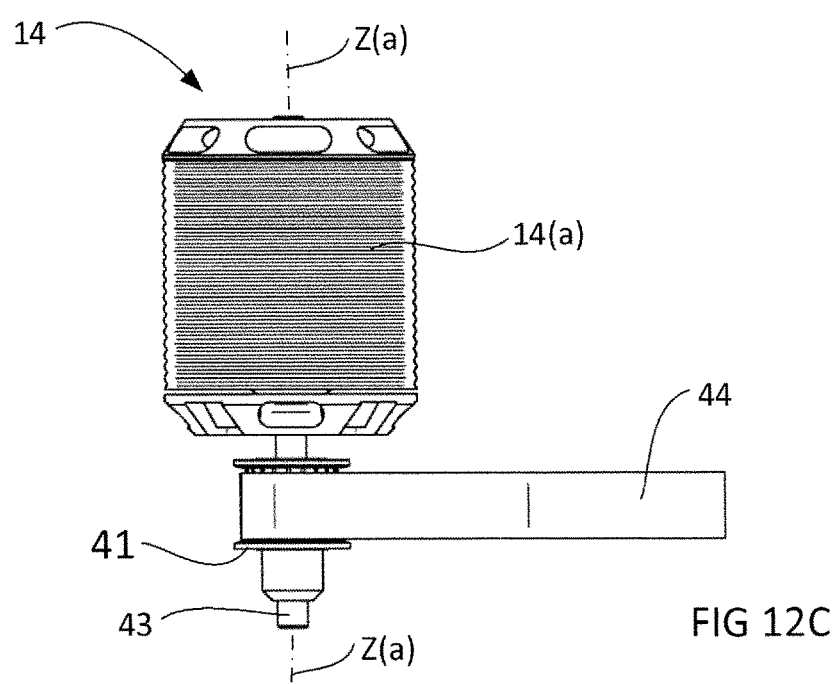
Figure 14A:
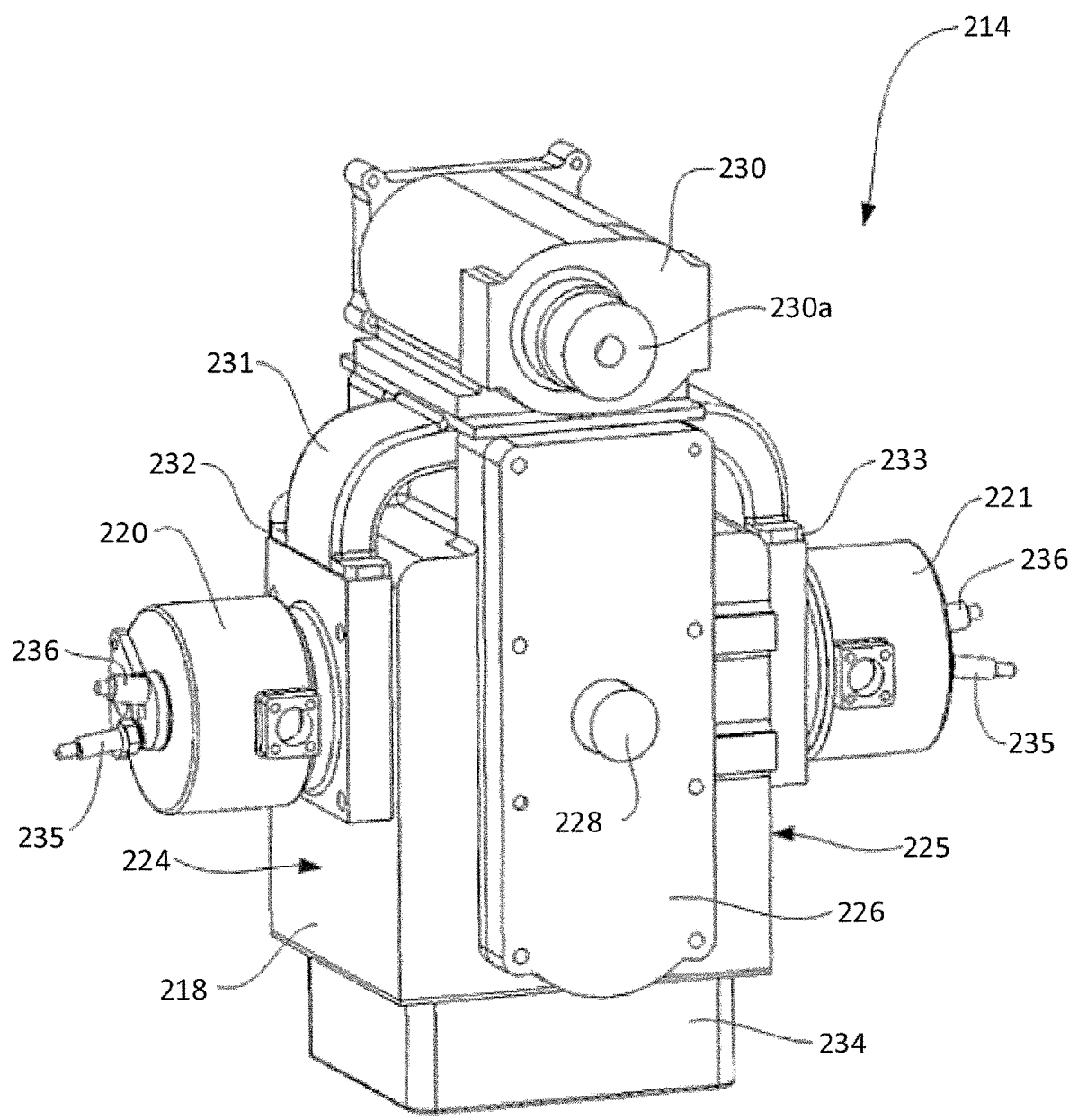
Figure 14B:
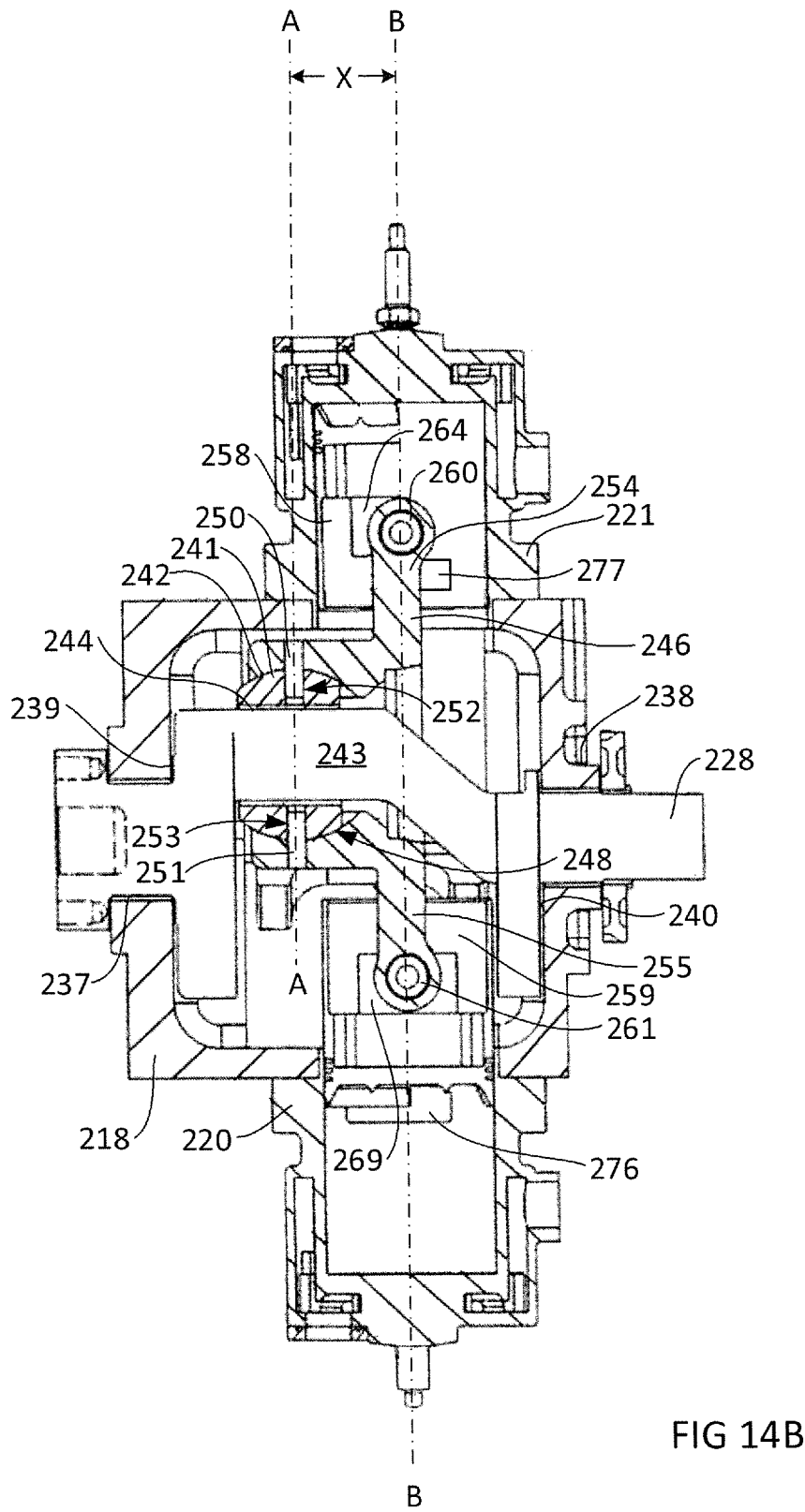
Figure 16A:
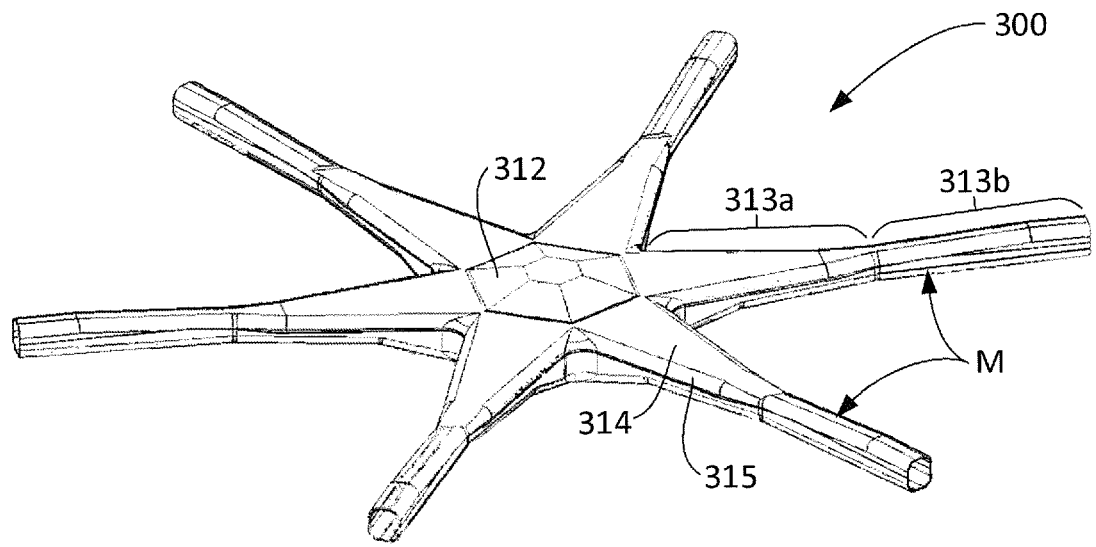
Figure 16B:
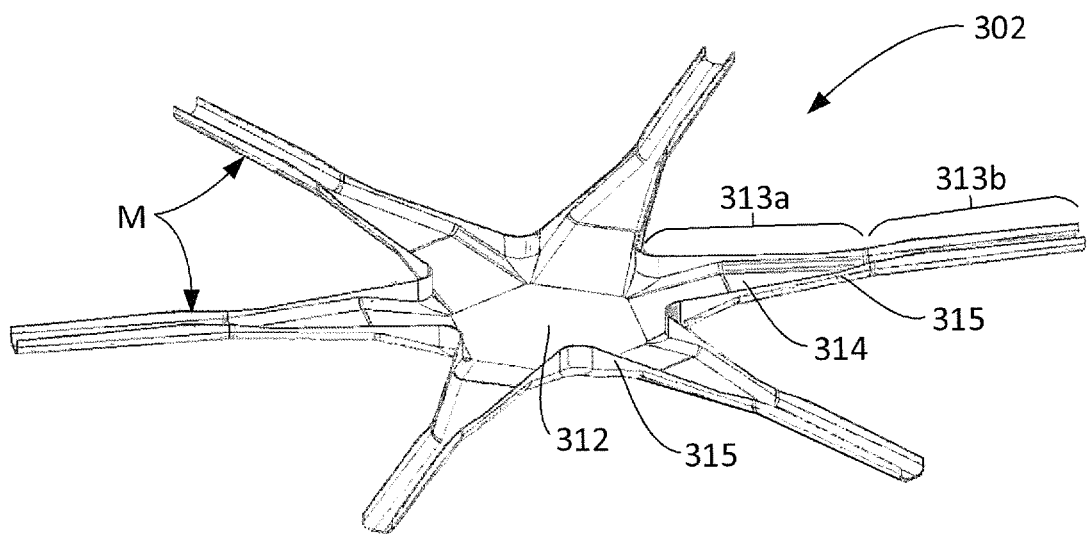

FIG. 4 corresponds to FIG. 3, but with some components omitted;

FIG. 5 is a side elevation of the central region of the machine as shown in of FIG. 3;

FIG. 6 shows an outer region, from the right hand side of FIG. 2, but on an enlarged scale;

FIG. 7 shows another outer region, from the forward, left side of FIG. 2, also on an enlarged scale;

FIG. 8 shows the drive system of the machine of FIG. 1, in isolation of the machine body and rotors;

FIG. 9 shows a side elevation view of the right hand part of the machine of FIG. 1;

FIG. 10 shows the part of the machine shown in FIG. 9, as seen from below;

FIGS. 11A and 11B are a sectional views, taken in opposite directions on the co-incident lines XI(A)-XI(B) of FIG. 10;

FIGS. 12A, 12B and 12C show a perspective, a plan view and a side elevation of an electric motor suitable for the machine of FIG. 1;

FIGS. 13A, 13B and 13C correspond to FIG. 12, but show an IC engine suitable for the machine of FIG. 1;

FIGS. 14A and 14B provide a perspective view and a part sectional view, respectively, of a 2-stroke IC engine, corresponding to FIGS. 1 and 3 of WO2014/078894 and suitable for the machine of FIG. 1;

FIG. 15 shows, in a view corresponding to FIG. 1, a second embodiment of a multi-rotor flying machine according to the invention; and FIGS. 16A and 16B show alternative monocoque chassis forms for a machine according to the present invention.

FIGS. 1 to 14 of the drawings show a multi-rotor flying machine 10. The machine 10, in the form illustrated, is an unmanned vehicle, specifically one with three rotor systems R that are distinguished as systems R(1), R(2) and R(3). Thus, the machine 10 comprises a tricopter. However, the features of machine 10 could be present in a machine with more than three rotor systems R so as to comprise a quadcopter, pentacopter, hexacopter, octocopter or other higher order multi-rotor machine.

The machine 10 has a body 12 on or in which a motor 14 is mounted. The body 12 has front and rear pairs of supports 13 on which the machine stands when not airborne. Also, each rotor system R has a respective head rotor 16 mounted on a respective mast 18 at each of three locations L, distinguished as locations L(1), L(2) and L(3), disposed around and spaced laterally outwardly from the motor 14. A respective one of three drivelines D, distinguished as drivelines D(1), D(2) and D(3), drivingly connects motor 14 to each mast 18, for rotating each head rotor 16 on the axis Z(m) of its mast 18. Adjacent to at least one mast 18, the machine 10 further includes a pitch rudder system P that includes a pitch driver or rotor, or translational rotor 22 rotatable on a lateral axis Y that is substantially perpendicular to a plane containing the axis Z(m) of the adjacent mast 18. The arrangement is such that the head rotors 16 are operable to provide thrust, while the pitch rudder system P enables yaw to be achieved independently of operation of the head rotors 16.

While machine 10 is shown as having only a single pitch rudder system P, the machine 10 could have a respective pitch rudder system P adjacent to each of at least two of the masts 18, or adjacent to each mast 18. It is desirable, but not imperative, that the single system P, or each of two or more systems P, be disposed substantially symmetrically with respect to a front to rear centreline C for machine 10. Thus, consistent with that desirable symmetry, the one system P shown is on or adjacent to that line C, while symmetry would be retained if a respective system P was to be installed at each location L. However, with two systems P, symmetry would require that each of the two systems P is at a respective location L at which there is no system P shown. That is, with two systems P, the symmetry preference would necessitate a respective system P at each of locations L(2) and L(3).

In the form illustrated, the multi-rotor flying machine 10 has three main arms or outriggers M, distinguished as main arm or outriggers M(1), M(2) and M(3), each extending outwardly in a respective direction from the body 12 to a respective one of locations L(1), L(2) and L(3). Each main arm or outrigger M has a respective one of the head rotors 16 mounted for rotation on the respective mast 18 at, or adjacent to, an end of the main arm or outrigger M that is remote from the body 12. The motor 14 is drivingly connected to each mast 18 by the respective driveline D extending within and along a respective main arm or outrigger M. Also, at the end of each main arm or outrigger M(2) and M(3) remote from body 12, the machine 10 has a respective depending, ground engaging support 15 that serves to stabilise machine 10 when resting on supports 13.

Below main arm or outrigger M(1), the machine includes a secondary arm M(s) that extends from body 12 to location L(1). The arm M(s) terminates a short distance beyond the end of main arm or outrigger M(1) and, at its end beyond arm or outrigger M(1), the arm M(s) carries a ground engaging support 15 to further stabilise machine 10 when on the ground. The pitch rudder system P is mounted on a side of an end portion of arm M(s) that projects beyond the end of arm or outrigger M(1) that is remote from body 12, with the rotor 22 of system P rotatable in a substantially vertical plane, on a horizontally disposed axis Y. Rotation of rotor 22 can be provided by a further driveline D(4) that extends from motor 14 to the system P, within and along arm M(s). Each of arms or outriggers M and the arm M(s) is connected at its inner end to body 12. Outwardly from body 12, the arm M(s) is secured at intervals to arm or outrigger M(1) by connectors 26.

As indicated above, preferred symmetry requires that a single assembly comprising a single pitch rudder system P and its rotor 22, and also comprising arm M(s) and driveline D(4), is mounted along the arm or outrigger M(1). Only the one assembly is shown for simplicity of illustration. However, if there were two such assemblies, preferred symmetry would require a respective assembly to be mounted along each one of arms or outriggers M(2) and M(3), without there being an assembly along arm or outrigger M(1). This would be preferred to having a first assembly along one of arms or outriggers M(2) and M(3) in combination with a second assembly along arm or outrigger M(1). Also, attainment of symmetry can be achieved with a respective assembly along each of arms or outriggers M(1), M(2) and M(3).

Only a simplified form of body 12 is shown in the drawings and substantial departures from the specific form are possible. The body 12 has a central chassis 28 above which a rigid, Y-shaped load support plate 30 is mounted. The plate 30 has three legs N, distinguished as legs N(1), N(2) and N(3), which extend from a central hub 32 of plate 30. Leg N(1) extends rearwards along centreline C for machine 10, with each leg N(2) and N(3) projecting both laterally outwardly to a respective side of body 12 and forwardly. Body 12 also includes an outer shell that, in the form shown, comprises left and right side walls 32, each having an inner panel 34 and an outer panel 36. Each wall 32 is recessed from its trailing end to provide a bight 38 through which a respective one of legs N(2) and N(3) of plate 30 projects.

The plate 30 is of a flat, skeletal upper form that defines the hub 32 and legs N. Adjacent to the end of each leg N remote from hub 32, the plate 30 also includes a pair of depending brackets 42, each having an upper part 42(*a*) integral with plate 30 and a lower part 42(*b*) that is bolted to part 42(*a*). The parts 42(*a*) and 42(*b*) of each bracket 42 together define an opening 42(*c*) having a diameter such that the inner end of each main arm or outrigger M(1), M(2) and M(3) is securely clamped between the parts 42(*a*) and 42(*b*) of each bracket 42 of the respective one of legs N(1), N(2) and N(3). Each driveline D(1), D(2) and D(3) extends from motor 14 below the respective one of legs N and into and through the respective arm or outrigger M to the respective mast 18.

While motor 14 could be an internal combustion engine, the drawings show an arrangement using an electric motor that is powered by a battery pack B. The motor 14 is supported above plate 30, over the spacing between legs N(2) and N(3), and has an output shaft 43 on which an output gear 41 (see FIG. 12) is rotatable at a level below plate 30, on a substantially vertical axis Z(a). The output gear 41 of motor 14 is able to transmit output drive from motor 14 to each driveline D. For this, the output gear 41 of motor 14 has external teeth that are meshed with a toothed drive belt 44, with belt 44 similarly engaging a gear 46 to drivingly couple gears 41 and 46. The gear 46 is mounted on a shaft 48 that is rotatable on an upright, preferably substantially vertical, axis Z(b) that is spaced laterally from axis Z(a). The gear 46 is supported below hub 32 of plate 30 and positioned symmetrically with respect to each of legs N of plate 30. The shaft 48 extends below gear 46 and has a helical gear 50 that forms a common part of a respective first gear system 52 for each driveline D. In the specific arrangement illustrated, each gear system 52 includes a respective main helical gear 54 that is mounted below plate 30 on a respective shaft 56 rotatable on a respective axis Z. The three axes Z are upright, preferably substantially vertical, and are distinguished as axes Z(1), Z(2) and Z(3). Gear 50 meshes with each gear 54 while, above gear 54, each gear system 52 has a small gear 58 that is rotatable on the respective shaft 56. The arrangement is such that each gear 58 is located adjacent to the inlet end of a respective one of main arms or outriggers M. Each driveline D includes a respective endless toothed belt 60 that extends around and meshes with the respective gear 58 and, from the gear 58, extends into and along the respective arm or outrigger M to a second gear system 62 contained in a sub-housing 17 that encloses both the remote end of the arm or outrigger M and the lower end of the respective mast 18.

Each mast 18 comprises an outer sleeve 18(*a*) and, concentrically within sleeve 18(*a*), a shaft 18(*b*) on the upper end of which the respective head rotor 16 is mounted. The respective second gear system 62 comprises a gear 64 secured on the lower end of shaft 18(*b*), below the lower end of sleeve 18(*a*), and the respective belt 60 extends around and meshes with the gear 64. Each shaft 18(*b*) and its head rotor 16 are rotatable in unison on the respective axis Z(m) by drive from motor 14 via the respective belt 60, while sleeve 18(*a*) is longitudinally adjustable relative to the shaft 18*b* but is held against rotation on the axis Z(m).

In the form shown, each head rotor 16 has an opposed pair of rotary wings or rotor blades 66, although a larger number of uniformly spaced wings or blades could be provided. Each wing or blade 66 has a horizontally extending, longitudinal axis (h) about which the wing or blade 66 is able to swivel for varying the pitch of the head rotor 16, with each axis Y(h) substantially perpendicular to the respective axis Z(m). Each rotor 16 has a hub 68 by which it is mounted on the respective shaft 18(*b*) and, for each wing or blade 66, a respective blade grip 70 mounted on the hub 68 and able to swivel on the axis Y(h). A respective pivot pin 72 connects the inner end of each wing or blade 66 is pivotally to a respective blade grip 70 so that each wing or blade 66 can pivot on the respective pin 72 in the plane of rotation for the head rotor 16 or the rotor disc. To enable this each pin connects that end of each wing or blade between fingers 70*a* defined by the outer end of a respective blade grip 70.

A respective pitch control mechanism 74 for each head rotor 16 enables adjustment of the pitch of the rotary wings or rotor blades 66. Each mechanism 74 comprises a linkage system 78 and a servomotor 75, with the servomotor secured by under the end of the respective main arm or outrigger M that is remote from body 12 by connectors 76, and operable to provide pitch adjustment through the linkage system under power supplied from a battery source, such as battery pack B. The servomotor 75 has a laterally projecting output shaft 75(a) on which a disc 75(b) is mounted, while the servomotor 75 is operable to reversibly rotate shaft 75(a) and disc 75(b) through a sufficient acute or obtuse angle, such as from about 70° to 140°. A first part of the linkage system 78 comprises a parallel pair of links 78(a), a rotatable disc 78(b) mounted by pin 77 on a side of sub-housing 17, a third link 78(c) and a non-rotatable lower annular disc 78(d) of a system 79 consisting of pair of adjacent discs disposed co-axially around mast 18. The disc 78(d) is held against rotation by having an extension 80 guided in a vertical slot 81(a) in an end plate 81 mounted on sub-housing 17. A second part of the linkage system 78 comprises a rotatable upper annular disc 78(e) of the system 79 and a pair of dogleg shaped links 78(f). The discs 75(b) and 78(b) are substantially co-planar and are spaced along arm or outrigger M, while they are disposed in an upright, preferably substantially vertical, plane. A respective end of a first one of links 78(a) is pivotally connected to each of the discs 75(b) and 78(b) adjacent to an upper end of a diameter of the discs, while a respective end of the other link 78(a) is similarly connected to each of discs 75(b) and 78(b) adjacent to the lower end of the diameter. A lower end of third link 78(c) is pivotally connected to disc 78(b), while its upper end is pivotally connected to the lower, non-rotatable annular disc 78(d) of system 79. A lower end of each link 78(f) is pivotally connected to a respective on of opposed side of rotatable annular disc of system 79, while the upper end of each link 78(f) is pivotally connected to a respective blade grip 70 of the rotor 16. The arrangement is such that actuation of servo-motor 75 to rotate disc 75(b) causes corresponding rotation of disc 78(b) due to the action of links 78(a), with rotation of disc 78(a) moving the discs 78(d) and 78(e) of system 79 axially with respect to mast 18, with this movement of disc 78e causing blade grips 70 to swivel on the axes Y(h), relative to hub 68, and corresponding swivelling of the wings or blades 66. The direction of swivelling of the grips 70 and blades 66 to increase or decrease the pitch of the blades 66 is controlled by the actuation of the servomotor 75.

The motor 14 also provides drive to the pitch rudder system P. Shaft 48 projects below gear 46 and has mounted thereon a further gear 82 also rotatable on axis Z(b), due to rotation of shaft 48 with gear 46 by drive from motor 14 via drive belt 44. The arrangement positions gear 82 in line with the inner end of secondary arm M(s), to enable the further driveline D(4) to extend into and along the secondary arm M(s), to provide drive for the pitch rudder system P. The driveline D(4) includes an endless toothed belt 60(a) that extends around and meshes with teeth (not shown) of gear 82 before extending into arm M(s), with belt 60(a) passing through arm M(s) to a second gear system 62(a) contained in a sub-housing 83 that encloses the remote end of the arm M(s). The pitch rudder system P includes a shaft 84 that extends laterally with respect to arm M(s), through a side of the sub-housing 83, with system P further including a pitch rotor 85 secured on the outer end of shaft 84. The inner end of shaft 84 has a toothed gear 86 comprising the second gear system 62(a), with belt 60(a) extending around and meshing with gear 86. Thus, with rotation of shaft 48 and gear 46 on axis Z(b) under drive provided by motor 14 via belt 44, gear 82 also is rotated on axis Z(b) to provide drive via driveline D(4) to gear 86, shaft 84 and rotor 85. However, as shaft 84 extends laterally with respect to arm M(s), an assembly comprising gear 86, shaft 84 and rotor 85 rotate on a laterally extending axis Y(I) that is substantially perpendicular to arm M(s) and to axes Z(a) and Z(b). Accordingly, belt 60(a) twists within arm M(s) so that movement along a part of its closed path of travel to and from gear 82 is in a laterally disposed plane and movement in a part of the path to and from gear 86 is in an upright, substantially vertical plane. This twisting is by means of a laterally spaced pair of guide rollers 87, seen most clearly in FIG. 10, located adjacent to the end of secondary arm M(s) nearer to motor 14.

The pitch rotor 85 is small relative to the head rotors 16, given the lesser thrust required of rotor 85 than of rotors 16 and the benefit of having rotor relatively close to one of the head rotors 16. However, despite the lesser thrust requirement for rotor 85, it is desirable that the pitch of rotor 85 be adjustable to enable variation of that thrust under differing conditions. Accordingly, as shown most clearly in FIGS. 9 to 11, the pitch rudder system P incorporates a pitch control mechanism 88 that is similar the respective mechanism 74 provided for each head rotor 16. As also shown in FIGS. 10 to 12, rotor 85 is mounted on shaft 84 in a manner similar to the manner in which each head rotor 16 is mounted on the respective mast 18.

At the left hand end of FIGS. 9 and 10, there is shown part of the driveline D(4), between the motor 14 to the nearer end of secondary arm M(s), in the form of the gear 82, its shaft 48, the belt 60(a) and the laterally spaced pair of guide rollers 87. The rollers 87 guide the belt 60(a) into the bore of the secondary arm M(s), with the belt 60(a) passing through the arm M(s) to the sub-housing 83 and passing around gear 86, with the change from vertical axes for rollers 87 to a horizontal axis for gear 86 resulting in a corresponding change in the plane in which parts of the runs of belt 60(a) move within arm M(s) compared to the parts of the runs moving between gear 82 and rollers 87. In the arrangement shown in FIGS. 9, 10 and 11, the pitch control mechanism 88 has a servomotor 89 mounted under arm M(s) and operable to adjusts the pitch setting of pitch rotor 85 through a linkage system 90. The servomotor 89 may be powered by a battery pack B and has a rotatable output shaft 88(a) with which a disc 88(b) is reversibly movable in required direction, while a rod 91 that extends along arm M(s) is longitudinally reversibly movable by rotation of disc 88(b) to adjust the pitch. The linkage system 90 has a first bell-crank lever 90(a), or a pair of such levers 90(a), a pair of second bell-crank levers 90(b), and a sleeve 90(c) slidable along shaft 84, with each of levers 90(a) and 90(b) having a respective end pivotally connected to sleeve 90(c). The other end of the or each bell-crank lever 90(a) is connected to the end of rod 91 that is remote from servomotor 89 and the other end of each lever 90(b) is pivotally connected to a respective blade grip 85(a) of pitch rotor 54 for oppositely adjusting each wing or blade 85(b) of the rotor 54 on an adjustment axis Y(v), disposed in a vertical plane, to attain a required pitch setting as sleeve 90(c) is moved along shaft 84 by the or each lever 90(a).

The views 12A, 12B and 12C of FIG. 12 show electric motor 14, corresponding to motor 14 shown in FIGS. 1 to 8. As in FIGS. 1 to 8, motor 14 is mounted (by means not shown) with its output shaft 43 depending below housing 14(a) of motor 14 and its rotational axis Z(a) vertically disposed. That orientation facilitates drive via horizontally disposed drivelines D(1), D(2) and D(3) to each of the respective rotor systems R(1), R(2) and R(3). In FIG. 12, the output gear 41 and toothed belt 44 are shown in relation to shaft 43.

The views 13A, 13B and 13C of FIG. 13 are similar to the views of FIG. 12, but show an internal combustion engine 114. As illustrated, the engine 114 is of a type suitable for use as a grass mower engine having a two-stroke single piston. However, the engine 114 is inverted relative to such use and has its output shaft 143 projecting upwardly with its rotational axis Z(a) vertically disposed. Shown in relation to shaft 143, FIG. 13 also depicts an output gear 141 and a toothed belt 144 that correspond respectively to gear 41 and belt 44 of FIG. 2. The one piston (not visible) of engine 114 reciprocates horizontally within a cylinder housing 100, towards and away from a top dead centre position adjacent the location for a spark plug 101 powered via current lead 102 from a suitable direct current source (not shown). While the internal structure of engine 114 also is not shown, it includes an inlet valve controlling the supply of fuel, in this instance LPG received from cylinder 103, and an exhaust port regulating exhaust gas discharge. The engine also has a crankshaft 104 driven by the piston and an inter-connecting con rod (not shown) to rotate on a horizontally disposed axis Y(c). Also, the crankshaft has a gear rotatable on axis Y(c) that meshes with and drives output shaft 143 on axis Z(a), with shaft 143 also carrying a flywheel rotatable on axis Z(a) within crankcase cover 105.

Operation with engine 114 is essentially the same as with engine 14 described. The differences reside in the type of engine relative to the type of engine 14, and the inversion of engine 114 so that shaft 143 projects upwardly, rather than downwardly in the case of engine 14. Obviously engine 143 will sit lower in its mountings when installed as part of a machine according to the invention, relative to the mounting of engine 14

FIGS. 14A and 14B show an alternative form of engine 214 suitable for use in a machine according to the invention. As with engine 114, engine 214 is an internal combustion engine. Specifically, engine 214 is a 2-stroke IC engine in accordance with the disclosure of international patent specification WO2014/078894. The engine 214 has a crankcase 218 in which two cylinders 220 and 221, with integral heads, are defined at opposite faces 224 and 230 in an opposed boxer arrangement. A front cover 226 encloses balance gears (not shown) and seals a crankshaft 228. A blower or supercharger 230 is mounted in a suitable position to allow air charging via a bifurcated manifold 231 to a respective inlet port 232 and 233 of cylinders 220 and 221. The supercharger 230 has a drive shaft 230a which could normally be driven by the crankshaft 228 of engine 217, via a belt or chain (not shown). An oil sump 234 completes the envelope for engine 217, while a sparkplug 235 and a direct fuel injector 236 is fitted to the head of each cylinder 220 and 221.

The crankshaft 228 is journalled in the crankcase 218 by journal bearings 237 and 238 and axially located by thrust bearings 239 and 240 against crankcase 218. A split yoke 241 with an outer spherical bearing surface 242 is journalled on the crankpin 243 of crankshaft 228. The yoke 241 has parts 241a and 241b that are joined on a parting plane by pins (not shown) inserted into aligned bores 241c of parts 241a and 241b. The yoke 241 can both rotate on and slide along crankpin 243 of crankshaft 228, via bearing 244. Yoke 241 is a neat fit within a two-part crosshead 246 that has a centrally located spherical mating surface 248 that is complementary to the spherical surface 242 of yoke 241. Pins 250 and 251 couple yoke 241 and crosshead 246, and allow pivoting of the yoke 241 relative to the crosshead 246 along axis A-A parallel to and offset from the centre-line axis B-B of engine cylinders 220 and 221 by a distance X. Pins 250 and 251 may be fixed on opposite ends of crosshead 246 and journalled into the pin connection 252 and 253 of yoke 241. The axis A-A is in a plane parallel to axis B-B, and also perpendicular to crankpin 243.

Crosshead 246 has oppositely extending arms 254 and 255 on each of which a respective piston 258 and 259 is mounted for reciprocation in respective cylinders 220 and 221. Each of pistons 258 and 259 is mounted in opposed relation to each other via a respective gudgeon pin 260 and 261 pivotally linking the outer end of each arm with a respective mounting block 264 and 265 fixed on piston 258 and 259. The axes of the gudgeon pins 260 and 261 are parallel to each other and perpendicular to the axis of the crankshaft 228. The gudgeon pins 260 and 261 and the connection to the pistons 258 and 259 respectively allow for any distortion or bending of the crosshead 246 during the power stroke in a plane perpendicular to the crankshaft 228, and prevent excessive loads being placed on the skirts of pistons 258 and 259.

Each piston 258 and 259 has a crown 268, with the periphery of crown 268 for each of pistons 258 and 259 having two diametrically opposed, arcuate skirts 270 which have a height above crown 268 that is governed by asymmetric characteristics that are desired in an engine. Between skirts 270 there is an inlet slot 272 and, diametrically opposed to slot 272, an exhaust slot 273. Also, radially inwardly from and across slot 272, crown 268 has a deflector bar 274 which can be semicircular, or of other elongate forms, such as linear or arcuate. The bar 274 is placed opposite the inlet slot 272 to deflect the incoming air supply from the scavenge pump (supercharger) 230 to assist in scavenging the exhaust gases and in charging the respective cylinder with fresh air. The skirts 270 on either side of slots 272 and 273 can have different heights depending on the asymmetric characteristics desired.

In operation, each of pistons 258 and 259 has a stroke the respective cylinder 220 and 221 that is determined by the throw of the crankpin 243 from the axis of crankshaft 228. The pistons 258 and 259 are connected by crosshead 246 and oscillate in their respective cylinders 220 and 221 in unison along axis B-B. The motion of the pistons 258 and 259 is transferred to the crankshaft 228 via the yoke 241 and by the offset X between the axis B-B and the axis A-A of yoke 241. This motion creates a symmetrical elliptical path of the pistons 258 and 259 as they move from their top dead centre to bottom dead centre positions. In effect, the pistons 258 and 259 oscillate circumferentially around the axis B-B through an angle determined by the offset X as they complete a cycle of reciprocation along axis B-B. This motion allows the each inlet slot 272 of each piston 258 and 259 to sweep both rotationally and linearly move over the inlet ports 232 and 233 and also, similarly allows the outlet or exhaust slot 273 to sweep both rotationally and linearly over a respective exhaust port 276 and 277 located at the lower portion of the cylinders 220 and 221. The positioning of the inlet and exhaust ports 276 and 277 of cylinder 220 in relation to the positioning of the piston slots 272 and 273 is chosen to enable the two-stroke engine to achieve the desired asymmetrical port timing and thereby achieve optimum fuel economy and increased power output. The desirable asymmetrical port timing enables the exhaust of the inlet ports on the downward path of the piston. On the upward path of the piston, the exhaust ports close first followed by the closure of the inlet port. This action assures that the cylinders are able to be fully charged with air and makes it possible for the engine to be supercharged. Direct fuel injection can then be applied and ignited from the spark plug via a conventional engine management system.

The engine 214 can be installed in a machine according to the invention in a number of different orientations. Thus, engine 214 may be installed with pistons 258 and 259 vertically opposed, with crankshaft 228 horizontally disposed. Alternatively, the pistons may be horizontally opposed, whether in a fore to aft direction or a transverse direction, with crankshaft either horizontally or vertically disposed. In each case, the crankshaft is able to provide drive via a gear system to a respective horizontally disposed driveline for each of the head rotors.

With either of engines 114 and 214, the machine in which it is installed preferably includes an alternator or starter arrangement (not shown). An alternator, for example, may be operable via a voltage regulator to maintain the charge of a battery pack used for secondary purposed, as distinct from providing drive to the head rotors. In this way the engine 114 or 214 is able to ensure electric power, such as that required for actuation of servomotors used for pitch adjustment and other purposes.

FIG. 15 shows a second multi-rotor flying machine 110. The machine 110 differs from machine 10 shown in FIGS. 1 to 14 only in that there is a respective secondary arm M(s) under each main arm or outrigger M, each with a respective pitch rudder system P, with the arms M(s) distinguished as arms M(s1), M(s2) and M(s3) and the rudder systems distinguished as P(1), P(2) and P(3). Apart from this difference, the all arrangement of 1 to 14.

The views of FIG. 16 provide perspective views from above of alternative monocoque chassis constructions including the body and arms or outriggers for a machine according to the present invention. In each case the construction is for a hexacopter, reference numerals for parts corresponding to those of machine 10 of FIGS. 1 to 14 increases by 300, but with the same reference letters. In FIGS. 16A and 16B, there is shown a chassis construction 300 and 302, respectively that has main arms or outriggers M that radiate out from a central body 312. While the arms or outriggers M are shown as equally angularly spaced at 60° intervals between centre lines, other arrangements are possible. Thus, taking the inline arms extending from left to right, the next adjacent arm M in each direction may be at a common angle less than 60°, such as 45°, so that a machine with such chassis is more elongate in a fore to aft direction. With each of chassis 300 and 302, the arms M taper so as to decrease in cross-section away from body 312 over a part 313a of its length, such as up to about 45% of the length, with the remaining part 313b of the length of substantially constant cross-section. In the case of FIG. 16A, the part 313a of each arm has a substantially planar upper wall 314 and a corresponding lower wall, with the upper and lower walls joined by curved side walls 315, while the parts 313b are of substantially circular cross-section. The chassis 302 is similar to the lower half of the chassis 300, such that arms M have of trough-like form, with parts 313a having a lower wall 314 and side walls 315 that are shallow compared with the walls 315 of chassis 300. The respective monocoque chassis constructions may be fabricated from carbon fibre reinforced material, of a non-ferrous sheet metal such as of an aluminium alloy or titanium, or of light steel sheet material.

The present invention provides a multi-rotor flying machine, such as machine 10 of FIGS. 1 to 14 and machine 110 of FIG. 15 that enables avoidance some limitations of known multi-rotor machines, and that also enables attainment of a number of benefits. The machine permits limitations on flight times, payload and aerodynamic control to be overcome. Also, the machine can provide substantially enhanced maneuverability to be attained. Additionally, while the benefits are enabled by use of a larger, single electric motor, the benefits are further increased by use of a single internal combustion. In the latter regard, an internal combustion engine permits full power to be available throughout the full available flight time or range. Also, an increased payload capacity permits provision of a power source, whether batteries for an electric motor or fuel for an IC engine, for an increased flight time or range.

As the drive to each head rotor is able to be the same, yaw or pirouette functions can be achieved by the use of a collective pitch rudder system, enabling enhanced yaw rates, such a up to practical limits of 720°/sec. The pitch and roll functions can be controlled via a collective pitch function adjacent to at least one, preferable more than one, head rotor.

Numerous variations and changes are possible in the machine of the invention, within the scope of the claims. For example, as the architecture for the machine is scalable, there exist efficiencies or gains able to be realised by, instead of having the main the main gear reduction at the centre of the aircraft as in the arrangement illustrated by the drawings, a respective gear reduction can be placed outboard with respect to the motor, at or adjacent to each rotor head. There even can be instances in which a combination of these alternative ratio reductions can be provided, with a gear reduction at the centre of the machine and a respective outboard gear reduction at or adjacent each rotor head. A factor to be taken into account in selecting between these arrangements is the type of drive system used to transmit drive from the motor to each rotor head. Drive belts, for example, can be run at high speed if lightly loaded, and facilitate use of reductions at the rotor heads, whereas torque tubes or drive shafts can transmit more torque and be run at lower speeds, facilitating reduction at the motor end of the drive transmission for transmitting speeds closer to 1:1 or at rotor head speed. Oher factors are the scale on which the machine is constructed, machine balance and centre of gravity considerations, overall airframe appearance, the form and materials of the drive system a gear reduction elements, and space considerations.

The invention claimed is:

1. A multi-rotor flying machine, wherein the machine includes a body on or in which a motor is mounted; the machine further including a respective head rotor mounted for rotation on a respective mast at each of at least three locations disposed around and spaced laterally outwardly from the motor, with each head rotor mounted on its respective mast in a manner enabling control of the pitch of the rotary wings or blades of the head rotor by each wing or blade being rotatable on an axis extending along the wing or blade, substantially radially with respect to the mast on which the head rotor is rotatable; wherein the motor is drivingly connected to each mast, for rotating each head rotor, by a respective driveline and, disposed adjacent to at least one mast, the machine further includes a pitch rudder system drivable by the motor; wherein the arrangement is such that the head rotors are operable to provide thrust, the masts are disposed substantially symmetrically with respect to a centerline from a front to a rear end of the machine and the pitch rudder system on or adjacent to the front to rear centerline; and wherein the pitch rudder system includes:

(a) a pitch or translational rotor,
(b) a mechanism for adjusting the pitch of the pitch or translational rotor;
(c) the pitch rudder system is drivable by the motor through a driveline, and
(d) the pitch rudder system is operable to enable yaw to be achieved independently of operation of the head rotors by means of thrust provided by the pitch rudder system and to enable variation, under differing conditions, of thrust generated by the pitch or translational rotor and, hence, yaw enabled by the pitch rudder system.

2. The multi-rotor flying machine of claim 1, wherein the machine has a respective pitch rudder system adjacent to each of at least two of the masts, such as a respective pitch rudder system adjacent to each mast, with the pitch rudder systems disposed symmetrically with respect to a front to rear centerline of the machine.

3. The multi-rotor flying machine of claim 1, wherein the machine has at least three main arms or outriggers, each extending outwardly in a respective direction from the body, with each of the head rotors mounted for rotation on the respective mast at, or adjacent to, an end of the main arm or outrigger remote from the body; and wherein the motor is drivingly connected to each mast by the respective driveline extending along a respective main arm or outrigger.

4. The multi-rotor flying machine of claim 1, wherein the body extends outwardly beyond the motor and has a chassis on which the motor and each of the masts are supported, and across which each of the drivelines extend.

5. The multi-rotor flying machine of claim 1, wherein the body has an interior that provides interior space for freight, passengers or a combination of freight and passengers.

6. The multi-rotor flying machine of claim 1, wherein the machine comprises a UAV or a drone.

7. The multi-rotor flying machine of claim 1, wherein the masts are disposed substantially symmetrically with respect to a center line from a front to a rear end of the machine, such as in a triangular, quadrilateral, pentagonal, hexagonal or octagonal array.

8. The multi-rotor flying machine of claim 1, wherein there is a respective coaxial pair of head rotors is mounted for rotation on each mast such as with the rotors of each pair mounted for contra-rotation.

9. The multi-rotor flying machine of claim 1, wherein the motor comprises an IC engine operable on petrol, gas, ethanol or any other suitable fluid fuel, whether gaseous or liquid fuel and either an intermittent combustion engine such as a 2-stroke or a 4-stroke petrol or diesel powered engine, or a continuous combustion engine such as a gas turbine engine.

10. The multi-rotor flying machine of claim 1, wherein the motor is operable to provide substantially the same drive to each head rotor such that the head rotors all rotate at substantially the same speed.

11. The multi-rotor flying machine of claim 1, wherein each mast comprises an outer sleeve and a shaft extending co-axially within the sleeve, with the head rotor mounted for rotation on or with the shaft relative to the sleeve, the machine having an adjustment assembly operable to vary the pitch of the wings or blades of the head rotor by adjusting the shaft axially relative to the sleeve.

12. The multi-rotor flying machine of claim 11, further including a servomotor device that has an output member connected to the shaft by a first part of a linkage system, with a second part of the linkage system provides a connection between the sleeve and each wing or blade of the head rotor, whereby actuation of the servomotor device adjusts the first part of the linkage system to cause the shaft to be raised or lowered relative to the sleeve to result in adjustment of the second part of the linkage system to cause the wings or blades to rotate and thereby vary their pitch.

13. The multi-rotor flying machine of claim 12, wherein the output member of the servomotor device is connected through a first part of the linkage system to a fixed one of two adjacent annular discs mounted co-axially with respect to the mast, with the other one of the two discs rotatable and connected to each wing or blade of the rotor by the second part of the linkage system, whereby actuation of the servomotor device adjusts the first part of the linkage system to cause the adjacent discs to move axially with respect to the mast to result in adjustment of the second part of the linkage system to rotate the wings or blades to rotate and vary their pitch.

14. The multi-rotor flying machine of claim 3, wherein each main arm or outrigger is of an elongate form, of a channel shape in cross-section, or of tubular form, and each main arm or outrigger is sufficiently stiff and strong as to be able to retain its form despite robust use and is made of:
(a) a suitable synthetic plastics material, comprising an engineering plastics material, fiber-reinforced plastics material, or a carbon fiber reinforced plastics material; or
(b) a suitable light metal alloy, comprising an aluminium alloy or a titanium alloy; and houses the driveline for the respective head rotor.

15. The multi-rotor flying machine of claim 1, wherein the motor has an output shaft rotatable on an upright axis, with the output shaft having an output member drivingly connected to a respective rotatable member of the driveline for each main arm or outrigger; and wherein the output member is a gear, and each rotatable member a gear of a first gear system of the driveline, and wherein the driveline further includes a drive shaft that is rotatable by the first gear system and that extends through the respective main arm or outrigger to a second gear system of the driveline at the remote end of the main arm or outrigger, with the second gear system drivingly connected to a gear member on the mast of a respective head rotor, whereby the motor is able to provide drive for simultaneous rotation of each head rotor through the respective driveline.

16. The multi-rotor flying machine of claim 1, wherein the motor has an output shaft rotatable on an upright axis, with the output shaft having an output member drivingly connected to a respective rotatable member of the driveline for each main arm or outrigger; and wherein the output member of the drive shaft of the motor is a gear that imparts drive to a respective first pulley wheel of each driveline, with each driveline also including an endless cable or belt that passes around the first pulley wheel, along the main arm or outrigger to the remote end, and around a second pulley wheel of the driveline that imparts drive to a gear member on the mast, whereby the motor is able to provide drive for simultaneous rotation of each head rotor through the respective driveline.

17. The multi-rotor flying machine of claim 1, wherein the machine has a respective pitch rudder system adjacent to each of the masts.

* * * * *